United States Patent
Goenka et al.

(10) Patent No.: US 12,190,348 B2
(45) Date of Patent: Jan. 7, 2025

(54) EVALUATING EMAIL ACTIVITY

(71) Applicant: Oath Inc., New York, NY (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 219 days.

(21) Appl. No.: 16/210,155

(22) Filed: Dec. 5, 2018

(65) Prior Publication Data

US 2020/0184511 A1 Jun. 11, 2020

(51) Int. Cl.
*G06Q 30/02* (2023.01)
*G06F 16/24* (2019.01)
*G06F 16/2457* (2019.01)
*G06Q 30/0242* (2023.01)
(Continued)

(52) U.S. Cl.
CPC ... *G06Q 30/0246* (2013.01); *G06F 16/24578* (2019.01); *G06Q 30/0244* (2013.01); *H04L 51/046* (2013.01)

(58) Field of Classification Search
CPC . G06Q 30/0246; G06Q 10/06398; G06N 5/02
See application file for complete search history.

(56) References Cited

U.S. PATENT DOCUMENTS

2005/0076220 A1* 4/2005 Zhang ............... H04L 63/126
713/176
2006/0253537 A1* 11/2006 Thomas ............... H04L 51/00
709/206
(Continued)

FOREIGN PATENT DOCUMENTS

AU 2008207930 A1 * 9/2009 ........... G06F 21/554

OTHER PUBLICATIONS

Dredze, Mark, Automatically Classifying Email into activities, University of Pennsylvania, Feb. 2006, p. 72 https://dl.acm.org/doi/pdf/10.1145/1111449.1111471 (Year: 2006).*
(Continued)

*Primary Examiner* — Saba Dagnew
(74) *Attorney, Agent, or Firm* — Cooper Legal Group LLC

(57) ABSTRACT

One or more computing devices, systems, and/or methods for evaluating email activity and/or controlling, based upon the email activity, transmission of instructions associated with quality are provided. A first email, transmitted by an email account associated with an entity to a plurality of email accounts, may be identified. First activity associated with the first email may be detected. A first set of activity information associated with the first activity may be stored in an entity profile associated with the entity. The entity profile may comprise a plurality of sets of activity information associated with a plurality of emails transmitted by one or more email accounts associated with the entity. A quality score corresponding to the first entity may be generated based upon the entity profile. A notification may be generated based upon the quality score. The notification may be transmitted to the first client device.

21 Claims, 8 Drawing Sheets

(51) Int. Cl.
*H04L 51/04* (2022.01)
*H04L 51/046* (2022.01)

(56) References Cited

U.S. PATENT DOCUMENTS

| | | | | |
|---|---|---|---|---|
| 2009/0030774 A1* | 1/2009 | Rothschild | ......... | G06Q 30/0255 705/14.1 |
| 2010/0115040 A1* | 5/2010 | Sargent | ................... | H04L 51/42 709/206 |
| 2012/0290662 A1* | 11/2012 | Weber | ................. | G06Q 10/107 709/206 |
| 2014/0280624 A1* | 9/2014 | Dillingham | ............. | H04L 51/22 709/206 |
| 2015/0046233 A1* | 2/2015 | Srulowitz | ........ | G06Q 10/06398 705/7.42 |
| 2015/0347925 A1* | 12/2015 | Zeng | ................. | G06Q 30/0242 709/206 |
| 2016/0098745 A1* | 4/2016 | Adams | ............... | G06Q 30/0246 705/14.45 |
| 2017/0140285 A1* | 5/2017 | Dotan-Cohen | ........ | G06Q 10/04 |
| 2018/0101599 A1* | 4/2018 | Arnold | ................. | G06F 40/274 |
| 2019/0222606 A1* | 7/2019 | Schweighauser | ........ | G06N 5/02 |
| 2020/0184511 A1* | 6/2020 | Goenka | ................. | H04L 51/046 |

OTHER PUBLICATIONS

Author(s): Ramachandran, Anirudh . Title: SPAM with behavior blacklist. Journal:ACM [online]. Publication date: 2007. [retrieved on:_May 7, 2022 ]. Retrieved from the Internet: <URL:https://dl.acm.org/doi/pdf/10.1145/1315245.1315288> (Year: 2007).*

Author(s): West, Andrew . Title: Mitigating Spam Journal: Penn Library [online]. Publication date: 2010.[retrieved on:_Sep. 27, 2022 ]. Retrieved from the Internet: <URL:https://repository.upenn.edu/cgi/viewcontent.cgi?article=1962&context=cis_reports > (Year: 2010).*

Author(s): Y Song. Title: Better Naive BayesJournal: Wiley [online]. Publication date: Apr. 22, 2009.[retrieved on: Mar. 9, 2023]. Retrieved from the Internet: < URL: https://onlinelibrary.wiley.com/doi/abs/10.1002/spe.925> (Year: 2009).*

Author(s): Burgess Title: Email training significantly reduces email Journal: Elsevier [online]. Publication date: Feb. 2005.[retrieved on: Aug. 11, 2023]. Retrieved from the Internet: < URL: https://www.sciencedirect.com/science/article/pii/S0268401204001069> (Year : 2005).*

* cited by examiner

EVALUATING EMAIL ACTIVITY

BACKGROUND

Many entities (e.g., clothing stores, restaurants, department stores, car dealers, etc.) may offer information services where a user may subscribe to an information service associated with an entity and/or may receive emails (e.g., newsletters, promotional information, etc.) related to the entity. However, some of the emails may have low quality content and as a result, some of the emails may be marked as spam, some of the emails may be deleted, users may not interact with some of the emails, etc.

SUMMARY

In accordance with the present disclosure, one or more computing devices and/or methods are provided. In an example, a first email transmitted to a plurality of email accounts may be identified. For example, the first email may be transmitted by a first email account associated with a first entity. First activity associated with the first email, performed using email accounts of the plurality of email accounts, may be detected. The first activity may be analyzed to generate a first set of activity information corresponding to the first activity. The first set of activity information may be stored in an entity profile associated with the first entity. The entity profile may comprise a plurality of sets of activity information associated with a plurality of emails transmitted by one or more email accounts associated with the first entity. The plurality of sets of activity information may comprise the first set of activity information. The plurality of emails may comprise the first email. Each set of activity information of the plurality of sets of activity information may correspond to activity associated with an email of the plurality of emails. A quality score corresponding to the first entity may be generated based upon the entity profile. A notification may be generated based upon the quality score. The notification may be transmitted to a first client device associated with the first entity.

In an example, a first message, transmitted to a plurality of client devices associated with a plurality of user accounts, may be identified. Each client device of the plurality of client devices may be associated with a user account of the plurality of user accounts. For example, the first email may be transmitted by a first client device associated with a first entity. First activity associated with the first message, performed using client devices of the plurality of client devices, may be detected. The first activity may be analyzed to generate a first quality score corresponding to the first activity. The first quality score may be stored in an entity profile associated with the first entity. The entity profile may comprise a plurality of quality scores associated with a plurality of messages transmitted by one or more client devices associated with the first entity. The plurality of quality scores may comprise the first quality score. The plurality of messages may comprise the first message. Each quality score of the plurality of quality scores may correspond to activity associated with a message of the plurality of messages. An entity quality score corresponding to the first entity may be generated based upon the entity profile. A notification may be generated based upon the entity quality score. The notification may be transmitted to a client device of the one or more client devices.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
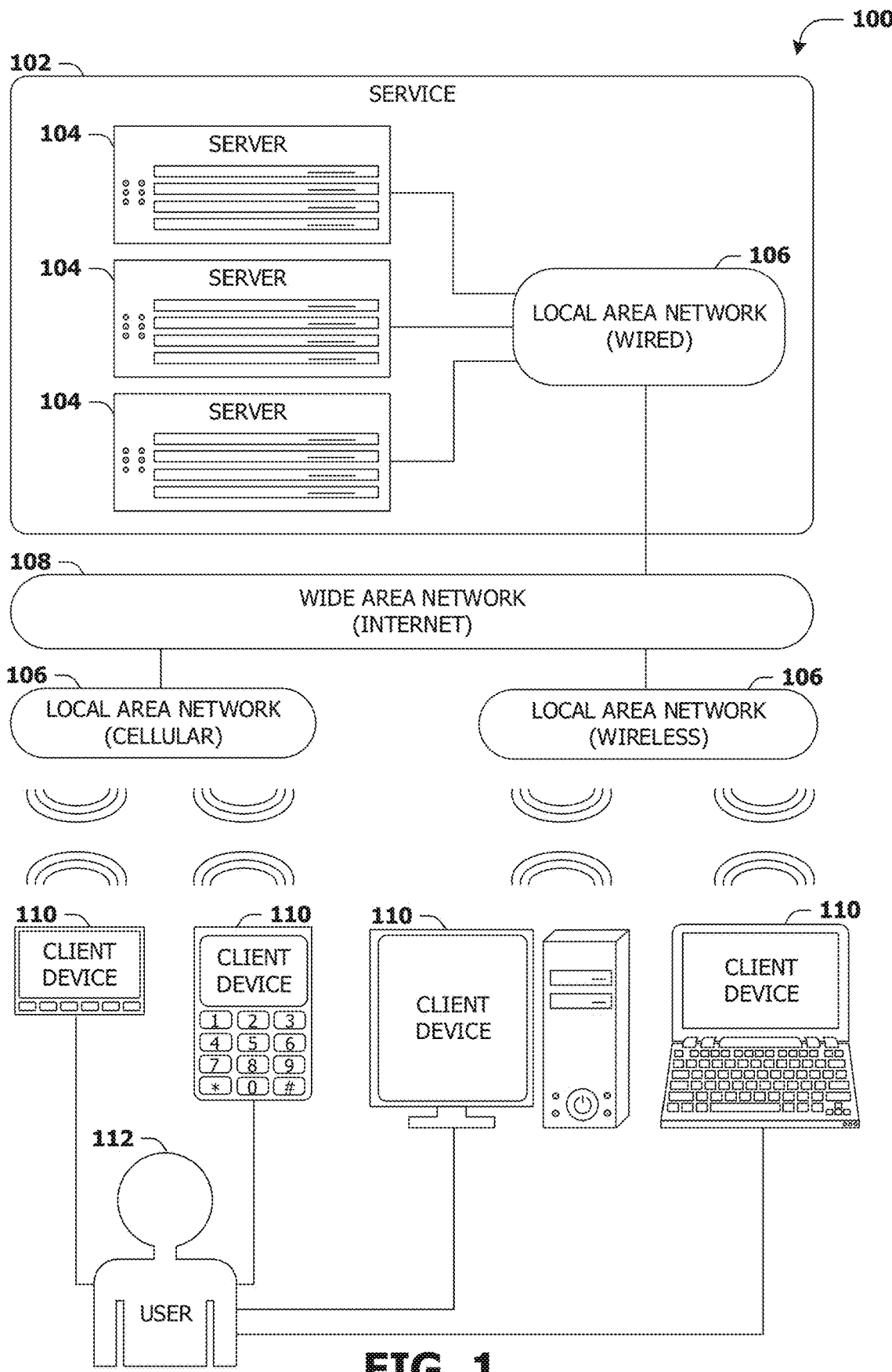
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
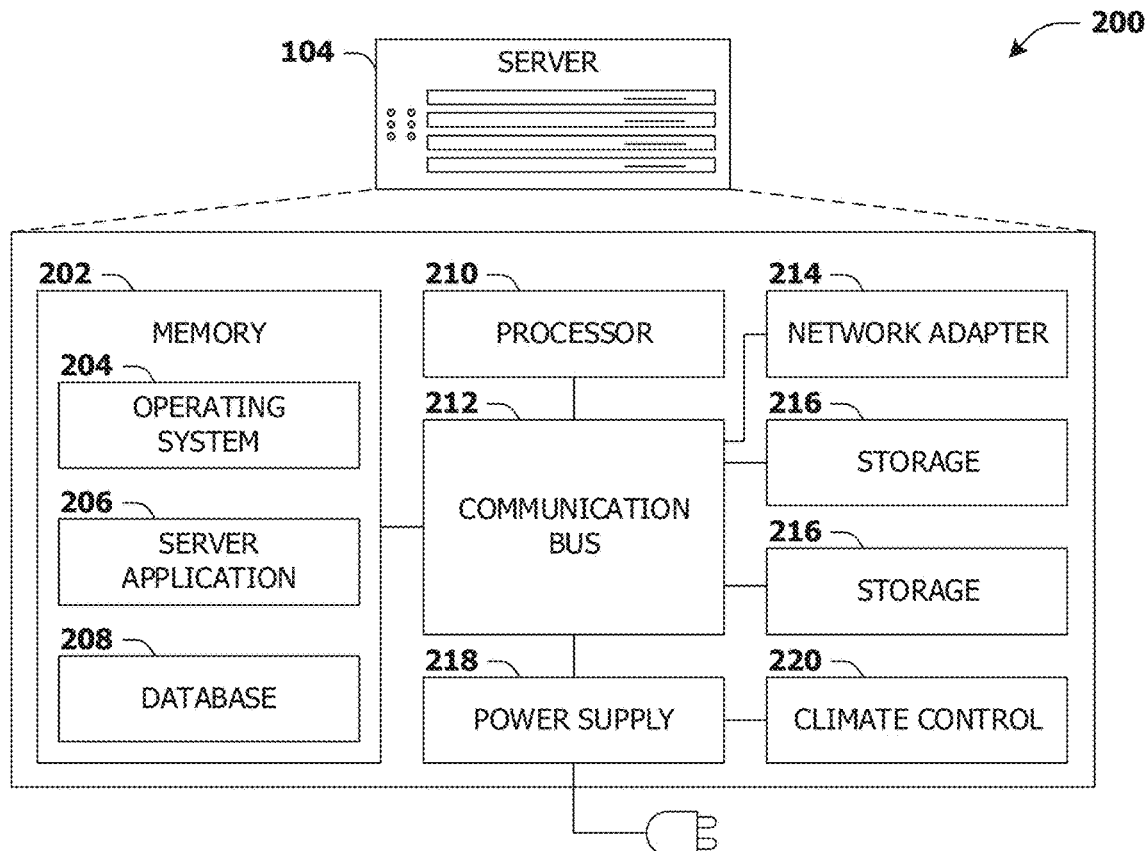
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
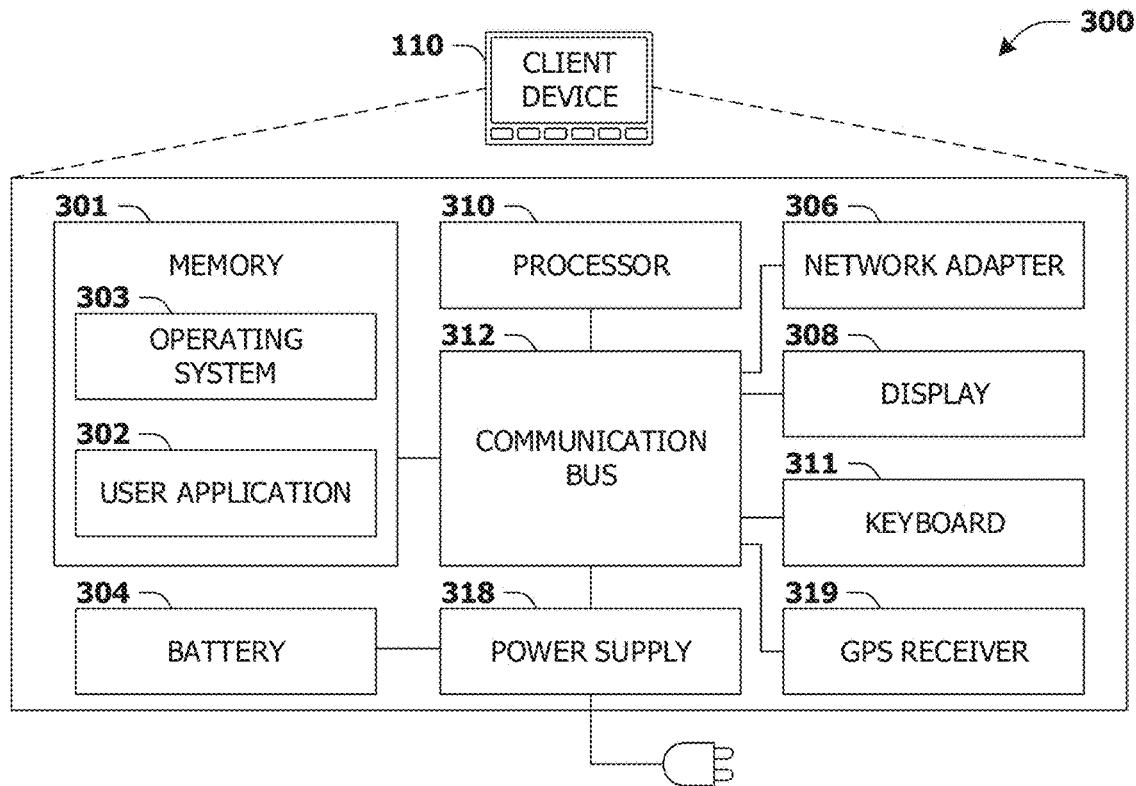
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for evaluating email activity and/or controlling, based upon the email activity, transmission of instructions associated with quality are provided. For example, entities (e.g., clothing stores, restaurants, department stores, car dealers, etc.) may offer information services. A user may subscribe to an information service (e.g., a bi-weekly newsletter, an email list, etc.) associated with an entity in order to receive information (e.g., car deals, newly added products, sales, etc.) related to the entity. For example, emails comprising content associated with the entity may be transmitted to an email account associated with the user. However, the user may not be interested in the emails (e.g., content of the emails may be undesirable to the user). Thus, one or more emails of the emails may be marked as spam and/or one or more emails of the emails may be deleted and/or the user may not select, open and/or interact with the emails.

In accordance with one or more of the techniques presented herein, a plurality of email accounts may be subscribed to a first information service associated with a first entity. A plurality of emails may be transmitted by a first email account associated with the first entity to the plurality of email accounts. Activity associated with the plurality of emails may be performed using email accounts of the plurality of email accounts. For example, an entity profile may be generated based upon the activity and/or content of the plurality of emails. For example, a quality score, corresponding to the first entity, may be generated based upon the entity profile. The quality score may be generated based upon content of the plurality of emails, click through rates (CTRs) associated with the plurality of emails, click-to-open rates associated with the plurality of emails, open rates associated with the plurality of emails, spam rates associated with the plurality of emails, etc.

In some examples, the quality score may be compared with a first threshold quality score to determine whether to suspend the first entity from one or more services. For example, responsive to a determination that the quality score is less than the first threshold quality score, the first entity may be suspended from the one or more services. Alternatively and/or additionally, the quality score may be compared with a second threshold quality score to determine whether to provide a payment to the first entity. For example, a quality compensation value may be determined based upon the quality score. An electronic payment, based upon the quality compensation value, may be transmitted to an account associated with the first entity. Alternatively and/or additionally, transmission of emails provided by the first email account may be controlled based upon the quality score. Alternatively and/or additionally, instructions may be generated based upon the quality score and/or may be transmitted to the first email account. For example, the instructions may comprise guidelines for creating high quality emails. Alternatively and/or additionally, responsive to determining that the quality score is less than a third threshold quality score, emails transmitted by one or more email accounts associated with the first entity may be modified (automatically) to generate modified versions of emails, which may then be transmitted to email accounts.

Figure 4:
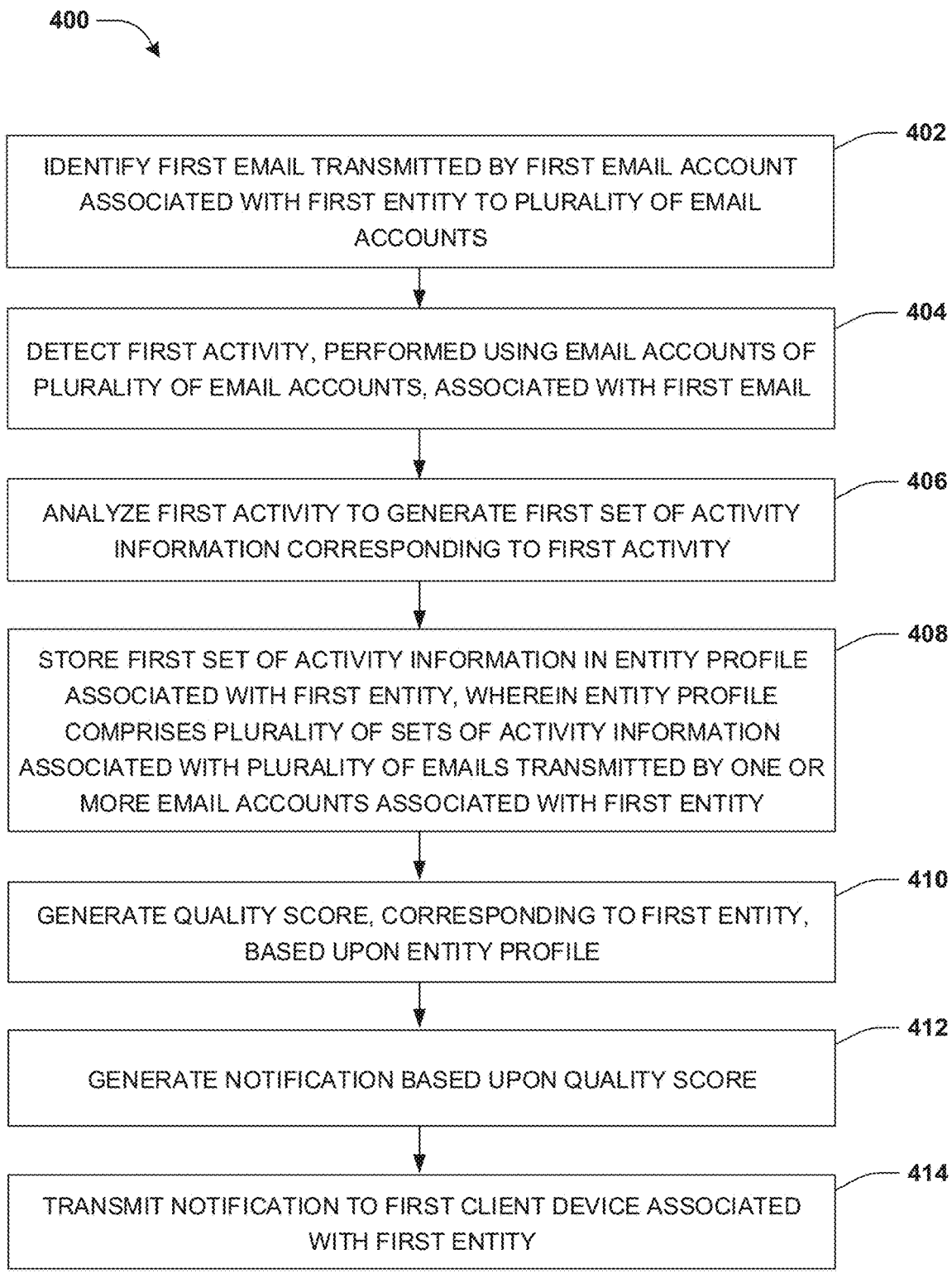
FIG. 4 is a flow chart illustrating an example method for evaluating email activity and/or controlling, based upon the email activity, transmission of instructions associated with quality.

An embodiment of evaluating email activity and/or controlling, based upon the email activity, transmission of instructions associated with quality is illustrated by an example method 400 of FIG. 4. A first user, such as user Jill, (e.g., and/or a first client device associated with the first user) may access and/or interact with a communication service (e.g., an email service provider, an instant messaging provider, a social media platform, etc.) for sending and/or receiving emails and/or performing communications via messaging, voice calls, video calls, social media posts, etc. For example, a first email account (and/or a different type of user account) of the first user with the communication service may be accessed and/or interacted with via a first email interface, such as an email client, a web interface accessed via a browser, an email application, etc. on the first client device.

In some examples, the communication service may be associated with a content system. For example, the content system may provide content items to be presented via one or more locations of the first email interface (and/or other email interfaces associated with the communication service). In some examples, the content system may use user information, such as activity information (e.g., search history information, website browsing history, email information, selections of selectable inputs, etc.), demographic information associated with the first user, location information, etc. to determine interests of the first user and/or select content for presentation to the first user based upon the interests of the first user.

Alternatively and/or additionally, the content system may provide content items to be presented via a plurality of web pages associated with the content system. For example, the content system may be associated with a service for providing content items to be presented in one or more locations throughout web pages of the plurality of web pages (e.g., one or more areas of the plurality of web pages configured for presentation of content items). Alternatively and/or additionally, the content system may provide content items to be presented in one or more locations throughout one or more browsers, one or more messaging interfaces, one or more music-streaming applications, one or more video applications, etc. In some examples, the content system may be associated with an advertising system (e.g., an online advertising system). For example, an entity associated with the content system may receive compensation (e.g., advertising revenue and/or payment) from entities associated with content items that the content system provides for presentation via the first email interface. Alternatively and/or additionally, the content system may not be associated with an advertising system.

In some examples, the first email account may be subscribed to an information service. For example, the first email account may be subscribed to the information service responsive to a server associated with the information service receiving a subscription request (corresponding to the information service) from the first client device associated with the first email account (e.g., the subscription request may be received via a web page associated with the information service, the subscription request may be received via the first email interface, etc.). For example, the information service may be associated with a first entity. For example, the first entity may be associated with a company, a store, an organization, a brand, a chain store, an internet store, a marketplace, a university, a school, a spiritual center, a blog, a forum, a question-and-answer platform, a person, etc. One or more first email accounts associated with the first entity (and/or associated with the information service) may transmit messages (e.g., emails) to email accounts subscribed to the information service. For example, the messages may comprise product information associated with the first entity, promotional content associated with the first entity, service information associated with the first entity, event information associated with the first entity, blog posts, social media posts, question-and-answer posts, forum posts, etc.

Alternatively and/or additionally, the one or more first email accounts may transmit messages (e.g., emails) to email accounts that are not subscribed to the information service. For example, messages may be transmitted to email accounts that are associated with users who have made purchases from the first entity. Alternatively and/or additionally, messages may be transmitted to email accounts that are associated with users who have signed up for one or more services of the entity. Alternatively and/or additionally, messages may be transmitted to email accounts that are associated with users who have provided email account information to the first entity.

At 402, a first email (and/or a different type of message) transmitted by a second email account associated with the first entity to a plurality of email accounts may be identified. For example, the first email may comprise product information associated with the first entity, promotional content associated with the first entity, service information associated with the first entity, event information associated with the first entity, one or more blog posts, one or more social media posts, one or more question-and-answer posts, one or more forum posts, one or more news articles, etc.

For example, email accounts of the plurality of email accounts may be subscribed to the information service. Alternatively and/or additionally, email accounts of the plurality of email accounts may not be subscribed to the information service. In some examples, each email account of the plurality of email accounts may be associated with the communication service (e.g., each email account of the plurality of email accounts may be supported by the email service provider). In some examples, the second email account may be comprised within the one or more first email accounts associated with the first entity. In some examples, the second email account may be associated with a first email address (e.g., "johnblogs@blog.com", "best@clothing.com", "no-reply@bestcomputers.com", etc.).

At 404, first activity performed using email accounts of the plurality of email accounts may be detected. For example, the first activity may be associated with the first email. In some examples, the plurality of email accounts may comprise the first email account. For example, the first email may be received by the first email account. Alternatively and/or additionally, the first email may be accessed via the first email interface on the first client device.

For example, the first activity may comprise the first email being opened using email interfaces associated with email accounts of the plurality of email accounts. Alternatively and/or additionally, the first activity may comprise interactions with the first email using email interfaces associated with email accounts of the plurality of email accounts. For example, the first activity may comprise selections of selectable inputs comprised within the first email using email interfaces associated with email accounts of the plurality of email accounts, selections of one or more content items (e.g., one or more images, one or more audio files, one or more videos, one or more files, etc.) comprised within the first email using email interfaces associated with email accounts of the plurality of email accounts, selections of one or more links comprised within the first email using email interfaces associated with email accounts of the plurality of email accounts, selections of one or more attachments of the first email using email interfaces associated with email accounts of the plurality of email accounts, etc. Alternatively and/or additionally, the first activity may comprise email actions, associated with the first email, performed using email interfaces associated with email accounts of the plurality of email accounts. For example, email actions may include the first email being forwarded to one or more email accounts, the first email being marked as desirable (e.g., the first email being starred), the first email being marked as spam (e.g., the first email being marked as undesirable, the first email marked as junk mail, etc.), the first email being deleted, etc.

In some examples, the first email being opened using email interfaces associated with the plurality of email accounts may be monitored and/or analyzed. For example, the first email may be opened (e.g., displayed, accessed, selected, etc.) using an email interface corresponding to each email account of a first set of email accounts of the plurality of email accounts. For example, a first quantity of email accounts associated with opening the first email may be determined. In some examples, the first quantity of email accounts may correspond to a quantity of email accounts of the first set of email accounts. Alternatively and/or additionally, a first quantity of open events of the first email being opened may be determined. For example, the first quantity of open events may correspond to a quantity of instances that the first email is opened using email interfaces associated with the first set of email accounts.

In some examples, the first quantity of email accounts associated with opening the first email may be determined by maintaining a first counter value corresponding to the first quantity of email accounts. The first counter value may be incremented by a first value (e.g., 1 and/or a different value) responsive to detecting that the first email is opened using an email interface associated with an email account of the plurality of email accounts. Alternatively and/or additionally, responsive to detecting multiple instances of the first email being opened using an email interface associated with an email account of the plurality of email accounts (e.g., 2 instances that the first email is opened using the (same) email interface associated with the (same) email account, etc.), the first counter value may be incremented by the first value (e.g., 1) merely once (e.g., the first counter value may not be incremented more than one time based upon the multiple instances that the first email is opened using the (same) email interface associated with the (same) email account). The first counter value may thus be generated based upon instances of the first email being opened across the plurality of email accounts, and may be indicative of the first quantity of email accounts.

In some examples, the first quantity of open events may be determined by maintaining a second counter value corresponding to the first quantity of open events. The second counter value may be incremented by a second value (e.g., 1 and/or a different value) responsive to determining that the first email is opened using an email interface associated with an email account of the plurality of email accounts. Alternatively and/or additionally, responsive to detecting multiple instances of the first email being opened using an email interface associated with an email account of the plurality of email accounts (e.g., 2 instances that the first email is opened using the (same) email interface associated with the (same) email account, etc.), the second counter value may be incremented by the second value (e.g., 1) responsive to each instance of the multiple instances that the first email is opened (e.g., the second counter value may increase by 2, rather than 1, based upon the 2 instances that the first email is opened using the (same) email interface associated with the (same) email account). The second counter value may thus be generated based upon instances of the first email being opened across the plurality of email accounts.

In an example, it may be determined that the first email is opened using the first email interface (and/or a different email interface) associated with the first email account. For example, it may be determined that the first email is opened by the first email interface responsive to receiving a request to access and/or display the first email from the first client device. Alternatively and/or additionally, it may be determined that the first email is opened by the first email interface responsive to receiving an indication that the first email is opened. For example, it may be determined that the first email is opened by the first email interface responsive to receiving a request for content (e.g., associated with the content system) and/or determining that the request for content comprises an indication of the first email and/or is associated with a content item to be presented in association with the first email.

In some examples, responsive to determining that the first email is opened using the first email interface associated with the first email account, the first counter value may be incremented by the first value (e.g., 1). Alternatively and/or additionally, if the first email is opened using the first email interface two or more times, the first counter value may be incremented by the first value merely once. Alternatively and/or additionally, if the first email is opened using the first email interface two or more times, the second counter value may be incremented by the second value (e.g., 1) two or more times and/or may be incremented by a third value (e.g., 2) once.

In some examples, an email open rate associated with the first email may be determined based upon the first quantity of email accounts (of the first set of email accounts associated with opening the first email). For example, the email open rate may be determined by combining the first quantity of email accounts with a total quantity of email accounts of the plurality of email accounts. In some examples, the email open rate may correspond to a proportion, a ratio and/or a percentage of email accounts, of the plurality of email accounts, that are associated with opening the first email. For example, the email open rate may be determined by dividing the first quantity of email accounts by the total quantity of email accounts. In an example, the total quantity of email accounts of the plurality of email accounts may be 100 email accounts (e.g., the plurality of email accounts may comprise 100 email accounts) and/or the first quantity of email accounts may be 10 email accounts (e.g., email interfaces associated with 10 email accounts of the plurality of email accounts may be used to open the first email). Accordingly, the email open rate may be 10%, 1/10, etc.

In some examples, selections of selectable inputs of the first email using email interfaces associated with the plurality of email accounts may be monitored and/or analyzed. For example, the first email may comprise a first set of selectable inputs (e.g., a first set of one or more selectable inputs). The first set of selectable inputs may comprise one or more content items of the first email, one or more buttons of the first email, one or more links of the first email and/or one or more attachments of the first email. In an example, the first entity may be associated with a clothing store and/or the one or more content items of the first email may comprise images of clothing products. For example, responsive to a selection of a content item of the one or more content items, a web page associated with a corresponding clothing product may be accessed. Alternatively and/or additionally, the one or more links of the first email may comprise a home page link corresponding to a home page of a website associated with the first entity. For example, responsive to a selection of the home page link, the home page of the website may be accessed.

For example, the selections of selectable inputs may comprise selections of the one or more content items, selections of the one or more buttons, selections of the one or more links and/or selections of the one or more attachments. For example, one or more selections of one or more selectable inputs of the first set of selectable inputs using an email interface corresponding to each email account of a second set of email accounts of the plurality of email accounts may be detected.

A second quantity of email accounts associated with selections of one or more selectable inputs of the first set of selectable inputs may be determined. The second quantity of email accounts may correspond to a quantity of email accounts of the second set of email accounts, for example. In some examples, the second quantity of email accounts may be determined by maintaining a third counter value corresponding to the second quantity of email accounts. The third counter value may be incremented by a fourth value (e.g., 1 and/or a different value) responsive to detecting that one or more selectable inputs are selected using an email interface associated with an email account of the plurality of email accounts.

Alternatively and/or additionally, a first quantity of selection events associated with a selectable input of the first set of selectable inputs being selected may be determined. The first quantity of selection events may correspond to a quantity of instances that at least one selectable input of the first set of selectable inputs is selected using an email interface associated with the second set of email accounts. For example, the first quantity of selection events may be determined by maintaining a fourth counter value corresponding to the first quantity of selection events. The fourth counter value may be incremented by a fifth value (e.g., 1 and/or a different value) responsive to each selection of a selectable input of the first set of selectable inputs (e.g., the fourth counter value may be incremented by the fifth value responsive to each selection event). For example, responsive to detecting three selection events via an email interface associated with an email account, the fourth counter value may be incremented by the fifth value three times.

In some examples, an email click through rate (CTR) associated with the first email may be determined based upon the second quantity of email accounts (associated with selections of selectable inputs). For example, the email CTR may be determined by combining the second quantity of email accounts with the total quantity of email accounts of the plurality of email accounts. In some examples, the email CTR may correspond to a proportion, a ratio and/or a percentage of email accounts, of the plurality of email accounts, that are associated with a selection of a selectable input of the first set of selectable inputs of the first email. For example, the email CTR may be determined by dividing the second quantity of email accounts by the total quantity of email accounts. In an example, the total quantity of email accounts of the plurality of email accounts may be 100 email accounts (e.g., the plurality of email accounts may comprise 100 email accounts) and/or the second quantity of email accounts may be 8 email accounts (e.g., email interfaces associated with 8 email accounts of the plurality of email accounts may be used to select one or more selectable inputs of the first set of selectable inputs of the first email). Accordingly, the email CTR may be 8%, 8/100, etc.

Alternatively and/or additionally, an email click-to-open rate associated with the first email may be determined based upon the second quantity of email accounts (associated with selections of selectable inputs) and/or the first quantity of email accounts (associated with opening the first email). For example, the email click-to-open rate may be determined by combining the second quantity of email accounts with the first quantity of email accounts. In some examples, the email click-to-open rate may correspond to a proportion, a ratio and/or a percentage of email accounts, of the first set of email accounts (associated with opening the first email), that are associated with a selection of one or more selectable inputs of the first set of selectable inputs of the first email. For example, the email click-to-open rate may be determined by dividing the second quantity of email accounts by the first quantity of email accounts. In an example, the first quantity of email accounts of the first set of email accounts may be 10 email accounts (e.g., the first set of email accounts may comprise 10 email accounts) and/or the second quantity of email accounts of the second set of email accounts may be 8 email accounts. Accordingly, the email click-to-open rate may be 80%, 8/10, etc.

Alternatively and/or additionally, forwarding events associated with the first email may be monitored and/or analyzed. For example, a forwarding event may correspond to the first email being forwarded, by an email account of the plurality of email accounts, to one or more email accounts. In some examples, a quantity of forwarding events may be determined.

Alternatively and/or additionally, copying events associated with the first email may be monitored and/or analyzed. For example, a copying event may correspond to a portion of the first email being copied using an email interface associated with an email account of the plurality of email accounts (e.g., the portion of the first email may be copied using a copy command associated with a client device). For example, a copying event may correspond to text of the first email being copied, one or more content items of the first email being copied, etc. Alternatively and/or additionally, a copying event may correspond to a screenshot being created using a client device associated with an email account of the plurality of email accounts, where the screenshot comprises at least a portion of the first email. In some examples, a quantity of copying events associated with the first email may be determined.

In some examples, displaying activity associated with the first email may be monitored and/or analyzed. For example, time-lengths that the first email is displayed using client devices associated with the email accounts of the plurality of email accounts may be determined. For example, responsive to the first email being opened using an email interface associated with an email account of the plurality of email accounts, displaying activity associated with the email interface may be monitored to determine a time-length (e.g., a duration of time) that the first email is displayed. For example, a plurality of time-lengths may be determined, wherein each time-length of the plurality of time-lengths may correspond to a duration of time that the first email is displayed using a client device associated with an email account of the plurality of email accounts.

In some examples, a measure of displaying activity may be generated based upon the plurality of time-lengths. For example, an operation (e.g., mathematical operation) may be performed using the plurality of time-lengths to generate the measure of displaying activity. For example, the measure of displaying activity may correspond to a mean (e.g., an average time-length) of the plurality of time-lengths. Alternatively and/or additionally, the measure of displaying activity may correspond to a median of the plurality of time-lengths. Alternatively and/or additionally, the measure of displaying activity may correspond to a sum total of the plurality of time-lengths.

Alternatively and/or additionally, consuming activity associated with the first email being consumed may be monitored and/or analyzed. For example, it may be determined that the first email is being consumed based upon the first email being displayed using a client device associated with an email account of the plurality of email accounts, based upon interactions with the first email (e.g., selecting text of the first email, selecting one or more content items of the first email, one or more copying events, scrolling through portions of the first email, displaying portions of the email, etc.), based upon an amount of text of the first email that is consumed (e.g., a quantity of characters consumed from within the first email, a quantity of words consumed from within the first email, etc.), based upon an amount of images, videos and/or audio files consumed from within the first email, based upon a time-length of the plurality of time-lengths that the first email is displayed using the client device, etc. For example, a measure of consuming activity may be determined based upon the plurality of time-lengths, interactions with the first email using client devices associated with the plurality of email accounts, the amount of text consumed from within the first email, the amount of images, videos and/or audio files consumed from within the first email, etc.

Alternatively and/or additionally, the first email being marked as spam (e.g., marked as undesirable, marked as junk mail, etc.) using email interfaces associated with the plurality of email accounts may be monitored and/or analyzed. For example, the first email may be marked as spam using an email interface corresponding to each email account of a third set of email accounts of the plurality of email accounts. For example, responsive to the first email being marked as spam using an email interface corresponding to an email account of the third set of email accounts, a spam message, indicative of the first email being marked as spam, may be received from the email account (and/or a client device associated with the email account). For example, a set of spam messages, indicative of the first email being marked as spam, may be received from the third set of email accounts.

In some examples, a quantity of spam events may be determined. For example, a spam event may correspond to the first email being marked as spam by an email account of the plurality of email accounts. For example, the quantity of spam events may correspond to a third quantity of email accounts of the third set of email accounts. Alternatively and/or additionally, an email spam rate associated with the first email may be determined based upon the quantity of spam events and/or the third quantity of email accounts. For example, the email spam rate may be determined by combining the third quantity of email accounts with the total quantity of email accounts of the plurality of email accounts. For example, the email spam rate may correspond to a proportion, a ratio and/or a percentage of email accounts, of the plurality of email accounts, associated with marking the first email as spam. For example, the email spam rate may be determined by dividing the third quantity of email accounts by the total quantity of email accounts. In an example, the total quantity of email accounts of the plurality of email accounts may be 100 email accounts and/or the third quantity of email accounts may be 4 email accounts (e.g., 4 email accounts of the plurality of email accounts may mark the first email as spam). Accordingly, the email spam rate may be 4%, 4/100, etc.

Alternatively and/or additionally, the first email being deleted using email interfaces associated with the plurality of email accounts may be monitored and/or analyzed. For example, the first email may be deleted using an email interface corresponding to each email account of a fourth set of email accounts of the plurality of email accounts. For example, responsive to the first email being deleted using an email interface corresponding to an email account of the fourth set of email accounts, a delete message, indicative of the first email being deleted, may be received from the email account (and/or a client device associated with the email account). For example, a set of delete messages, indicative of the first email being deleted, may be received from the fourth set of email accounts.

In some examples, a quantity of delete events may be determined. For example, a delete event may correspond to the first email being deleted by an email account of the plurality of email accounts. For example, the quantity of delete events may correspond to a fourth quantity of email accounts of the fourth set of email accounts. Alternatively and/or additionally, an email delete rate associated with the first email may be determined based upon the quantity of delete events and/or the fourth quantity of email accounts. For example, the email delete rate may be determined by combining the fourth quantity of email accounts with the total quantity of email accounts of the plurality of email accounts. For example, the email delete rate may correspond to a proportion, a ratio and/or a percentage of email accounts, of the plurality of email accounts, associated with deleting the first email. For example, the email delete rate may be determined by dividing the fourth quantity of email accounts by the total quantity of email accounts. In an example, the total quantity of email accounts of the plurality of email accounts may be 100 email accounts and/or the fourth quantity of email accounts may be 6 email accounts (e.g., 6 email accounts of the plurality of email accounts may delete the first email). Accordingly, the email delete rate may be 6%, 6/100, etc.

Alternatively and/or additionally, the first email being marked as desirable (e.g., the first email being starred, the first email being favorited, the first email being bookmarked, the first email being marked as important, etc.) using email interfaces associated with the plurality of email accounts may be monitored and/or analyzed. For example, the first email may be marked as desirable using an email interface corresponding to each email account of a fifth set of email accounts of the plurality of email accounts. For example, responsive to the first email being marked as desirable using an email interface corresponding to an email account of the fifth set of email accounts, a desirable message, indicative of the first email being marked as desirable, may be received from the email account (and/or a client device associated with the email account). For example, a set of desirable messages, indicative of the first email being marked as desirable, may be received from the fifth set of email accounts.

In some examples, a quantity of desirable events may be determined. For example, a desirable event may correspond to the first email being marked as desirable by an email account of plurality of email accounts. For example, the quantity of desirable events may correspond to a fifth quantity of email accounts of the fifth set of email accounts. Alternatively and/or additionally, an email desirable rate associated with the first email may be determined based upon the quantity of desirable events and/or the fifth quantity of email accounts. For example, the email desirable rate may be determined by combining the fifth quantity of email accounts with the total quantity of email accounts of the plurality of email accounts. For example, the email desirable rate may correspond to a proportion, a ratio and/or a percentage of email accounts, of the plurality of email accounts, associated with marking the first email as desirable. For example, the email desirable rate may be determined by dividing the fifth quantity of email accounts by the total quantity of email accounts. In an example, the total quantity of email accounts of the plurality of email accounts may be 100 email accounts and/or the fifth quantity of email accounts may be 7 email accounts (e.g., 7 email accounts of the plurality of email accounts may mark the first email as desirable). Accordingly, the email spam rate may be 7%, 7/100, etc.

Alternatively and/or additionally, related activity may be monitored and/or analyzed. For example, the related activity may correspond to activity, related to the first email, performed using client devices associated with email accounts of the plurality of email accounts. For example, the related activity may comprise social media posts being posted and/or transmitted by client devices associated with email accounts of the plurality of email accounts, wherein the social media posts may comprise content related to the first email (e.g., the first email may comprise be associated with a shopping event and/or the social media posts may comprise information associated with the shopping event).

Alternatively and/or additionally, the related activity may comprise related emails being transmitted by email accounts of the plurality of email accounts, wherein the related emails may comprise content related to the first email. Alternatively and/or additionally, the related activity may comprise related messages transmitted by client devices associated with email accounts of the plurality of email accounts, wherein the related messages may comprise content related to the first email. Alternatively and/or additionally, the related activity may comprise related search activity, wherein queries associated with the content of the first email may be used to perform searches using a search interface (e.g., such as by using a web search engine).

In some examples, the related activity may merely include activity performed within a first threshold duration of time after transmission of the first email to the plurality of email accounts (e.g., while not including activity performed before transmission of the first email and/or not including activity performed after the first threshold duration of time after transmission of the first email). Alternatively and/or additionally, the related activity may merely include activity performed by a client device associated with an email account within a second threshold duration of time after the first email is opened using an email interface associated with the email account. It may be appreciated that the related activity may be indicative of users associated with email accounts associated with the related activity having an interest in the first email.

In some examples, a measure of related activity may be determined based upon the social media posts posted and/or transmitted by client devices associated with email accounts of the plurality of email accounts, the related emails transmitted by email accounts of the plurality of email accounts, the related messages transmitted by client devices associated with email accounts of the plurality of email accounts and/or the related search activity. For example, the measure of related activity may be determined based upon a quantity of social media posts of the social media posts, a quantity of emails of the related emails, a quantity of messages of the related messages and/or a quantity of queries and/or searches associated with the related search activity.

In some examples, a plurality of content items may be displayed on client devices associated with email accounts of the plurality of email accounts. For example, the plurality of content items may be displayed using email interfaces associated with email accounts of the plurality of email accounts. For example, the plurality of content items may be displayed during the first activity associated with the first email. For example, one or more content items of the plurality of content items may be displayed while the first email is opened and/or displayed using an email interface associated with an email account of the plurality of email accounts. Alternatively and/or additionally, one or more content items of the plurality of content items may be displayed responsive to a selection of a selectable input of the first set of selectable inputs of the first email.

Alternatively and/or additionally, one or more content items of the plurality of content items may be displayed responsive to a client device associated with an email account of the plurality of email accounts accessing the email interface and/or the email account after leaving the email interface responsive to a selection of a selectable input of the first set of selectable inputs. Alternatively and/or additionally, one or more content items of the plurality of content items may be displayed responsive to a selection of a selectable input corresponding to forwarding the first email. Alternatively and/or additionally, one or more content items of the plurality of content items may be displayed on a search interface while a query associated with content of the first email is inputted into the search interface and/or on a web page of the search interface comprising search results generated based upon the query.

In some examples, the plurality of content items may be advertisements. For example, a first advertisement revenue received in association with the plurality of content items being displayed on client devices associated with email accounts of the plurality of email accounts may be determined. Alternatively and/or additionally, the first advertisement revenue may be indicative of a payment amount and/or compensation received by an entity associated with the content system from entities associated with the plurality of content items for displaying the plurality of content items.

At 406, the first activity may be analyzed to generate a first set of activity information corresponding to the first activity. In some examples, the first set of activity information may be generated based upon one or more of the first quantity of email accounts (of the first set of email accounts associated with opening the first email), the first quantity of open events, the email open rate associated with the first email, the second quantity of email accounts (of the second set of email accounts associated with selecting one or more selectable inputs of the first set of selectable inputs of the first email), the first quantity of selection events, the email CTR associated with the first email, the email click-to-open rate associated with the first email, the quantity of forwarding events, the quantity of copying events, the measure of displaying activity, the measure of consuming activity, the quantity of spam events, the email spam rate, the quantity of delete events, the email delete rate, the quantity of desirable events, the email desirable rate, the measure of related activity, the total quantity of email accounts, etc.

For example, the first set of activity information may comprise one or more of the first quantity of email accounts, the first quantity of open events, the email open rate associated with the first email, the second quantity of email accounts, the first quantity of selection events, the email CTR, the email click-to-open rate, the quantity of forwarding events, the quantity of copying events, the measure of displaying activity, the measure of consuming activity, the quantity of spam events, the email spam rate, the quantity of delete events, the email delete rate, the quantity of desirable events, the email desirable rate, the measure of related activity, the total quantity of email accounts, etc.

In some examples, content of the first email may be analyzed to generate an informational score corresponding to the first email based upon whether the first email comprises informational content that may be interesting to users associated with the plurality of email accounts and/or an amount of content of the first email. Alternatively and/or additionally, the content of the first email may be analyzed to generate a writing score based upon an amount of writing errors (e.g., grammatical errors, spelling errors, etc.) that the first email comprises. Alternatively and/or additionally, the content of the first email may be analyzed to generate a desirability score based upon whether the first email is determined to be desirable for a user of the plurality of users to consume (e.g., whether the first email comprises images, whether the first email comprises colorful text, whether the first email is visually appealing, etc.). In some examples, the informational score, the writing score and/or the desirability score may be generated using one or more machine learning techniques.

In some examples, a first quality score corresponding to the first email may be generated based upon the first set of activity information, the content of the first email and/or the first advertisement revenue. For example, the first quality score may be indicative of a quality of the first email. Alternatively and/or additionally, the first quality score may be indicative of a level of interest that users associated with the plurality of email accounts may have in the first email, a level of engagement of users associated with the plurality of email accounts with the first email, etc.

For example, a first set of representations (e.g., a set of one or more representations, such as a set of one or more vector representations) may be generated based upon the first quantity of email accounts (of the first set of email accounts associated with opening the first email). A second set of representations may be generated based upon the first quantity of open events. A third set of representations may be generated based upon the email open rate associated with the first email. A fourth set of representations may be generated based upon the second quantity of email accounts (of the second set of email accounts associated with selecting a selectable input of the first set of selectable inputs of the first email).

A fifth set of representations may be generated based upon the first quantity of selection events. A sixth set of representations may be generated based upon the email CTR associated with the first email. A seventh set of representations may be generated based upon the email click-to-open rate associated with the first email. An eighth set of representations may be generated based upon the quantity of forwarding events. A ninth set of representations may be generated based upon the quantity of copying events. A tenth set of representations may be generated based upon the measure of displaying activity.

An eleventh set of representations may be generated based upon the measure of consuming activity. A twelfth set of representations may be generated based upon the quantity of spam events. A thirteenth set of representations may be generated based upon the email spam rate. A fourteenth set of representations may be generated based upon the quantity of delete events. A fifteenth set of representations may be generated based upon the email delete rate.

A sixteenth set of representations may be generated based upon the quantity of desirable events. A seventeenth set of representations may be generated based upon the email desirable rate. An eighteenth set of representations may be generated based upon the measure of related activity. A nineteenth set of representations may be generated based upon the first advertisement revenue. A twentieth set of representations may be generated based upon the writing score associated with the first email. A twenty-first set of representations may be generated based upon the desirability score associated with the first email. A twenty-second set of representations may be generated based upon the informational score associated with the first email. A twenty-third set of representations may be generated based upon the total quantity of email accounts of the plurality of email accounts.

In some examples, two or more sets of representations of the first set of representations, the second set of representations, the third set of representations, the fourth set of representations, the fifth set of representations, the sixth set of representations, the seventh set of representations, the eighth set of representations, the ninth set of representations, the tenth set of representations, the eleventh set of representations, the twelfth set of representations, the thirteenth set of representations, the fourteenth set of representations, the fifteenth set of representations, the sixteenth set of representations, the seventeenth set of representations, the eighteenth set of representations, the nineteenth set of representations, the twentieth set of representations, the twenty-first set of representations, the twenty-second set of representations and/or the twenty-third set of representations may be combined to generate the first quality score.

In a first example, the email open rate may be determined to be a first exemplary email open rate (e.g., 40%) and/or the first quality score may be a first exemplary quality score. In a second example, the email open rate may be determined to be a second exemplary email open rate (e.g., 10%) and/or the first quality score corresponding to the first email may be a second exemplary quality score. The first exemplary email open rate may be higher than the second exemplary email open rate. For example, the first exemplary quality score may be higher (and/or lower) than the second exemplary quality score.

In a third example, the email CTR may be determined to be a first exemplary email CTR (e.g., 30%) and/or the first quality score may be a third exemplary quality score. In a fourth example, the email CTR may be determined to be a second exemplary email CTR (e.g., 4%) and/or the first quality score may be a fourth exemplary quality score. The first exemplary email CTR may be higher than the second exemplary email CTR. For example, the third exemplary quality score may be higher (and/or lower) than the fourth exemplary quality score.

In a fifth example, the email click-to-open rate may be determined to a first exemplary email click-to-open rate (e.g., 75%) and/or the first quality score may be a fifth exemplary quality score. In a sixth example, the email click-to-open rate may be determined to be a second exemplary email click-to-open rate (e.g., 40%) and/or the first quality score may be a sixth exemplary quality score. The first exemplary email click-to-open rate may be higher than the second exemplary email click-to-open rate. For example, the fifth exemplary quality score may be higher (and/or lower) than the sixth exemplary quality score.

In a seventh example, the quantity of forwarding events may be determined to be a first exemplary quantity of forwarding events (e.g., 10 forwarding events) and/or the first quality score may be a seventh exemplary quality score. In an eighth example, the quantity of forwarding events may be determined to be a second exemplary quantity of forwarding events (e.g., 2 forwarding events) and/or the first quality score may be an eighth exemplary quality score. The first exemplary quantity of forwarding events may be higher than the second exemplary quantity of forwarding events. For example, the seventh exemplary quality score may be higher (and/or lower) than the eighth exemplary quality score.

In a ninth example, the measure of displaying activity may be determined to be a first exemplary measure of displaying activity and/or the first quality score may be a ninth exemplary quality score. In a tenth example, the measure of displaying activity may be determined to be a second exemplary measure of displaying activity and/or the first quality score may be a tenth exemplary quality score. The first exemplary measure of displaying activity may be higher than the second exemplary measure of displaying activity. For example, the ninth exemplary quality score may be higher (and/or lower) than the tenth exemplary quality score.

In an eleventh example, the email spam rate may be determined to be a first exemplary email spam rate (e.g., 8%) and/or the first quality score may be an eleventh exemplary quality score. In a twelfth example, the email spam rate may be determined to be a second exemplary email spam rate (e.g., 2%) and/or the first quality score may be a twelfth exemplary quality score. The first exemplary email spam rate may be higher than the second exemplary email spam rate. For example, the eleventh exemplary quality score may be lower (and/or higher) than the twelfth exemplary quality score.

At 408, the first set of activity information may be stored in an entity profile associated with the first entity. Alternatively and/or additionally, the first quality score may be stored in the entity profile associated with the first entity. Alternatively and/or additionally, the informational score, the writing score and/or the desirability score corresponding to the first email may be stored in the entity profile. Alternatively and/or additionally, the first quality score corresponding to the first email may be stored in the entity profile.

In some examples, the entity profile may comprise a plurality of sets of activity information, associated with a plurality of emails transmitted by the second email account (and/or one or more different email accounts associated with the first entity). Alternatively and/or additionally, the plurality of sets of activity information may comprise the first set of activity information and/or the plurality of emails may comprise the first email. In some examples, each set of activity information of the plurality of sets of activity information may correspond to activity associated with an email of the plurality of emails.

Alternatively and/or additionally, the entity profile may comprise a plurality of advertisement revenues associated with the plurality of emails. For example, the plurality of advertisement revenues may comprise the first activity revenue. In some examples, each activity revenue of the plurality of activity revenues may correspond to an email of the plurality of emails.

Alternatively and/or additionally, the entity profile may comprise a plurality of quality scores associated with the plurality of emails. For example, the plurality of quality scores may comprise the first quality score. In some examples, each quality score of the plurality of quality scores may be generated based upon content of an email of the plurality of emails, activity associated with the email and/or advertisement revenue associated with the email.

At 410, an entity quality score corresponding to the first entity may be generated based upon the entity profile. For example, the entity quality score may be generated based upon the plurality of sets of activity information.

Alternatively and/or additionally, a plurality of sets of content of the plurality of emails may be analyzed (e.g., each set of content of the plurality of sets of content may correspond to an email of the plurality of emails). For example, a plurality of informational scores corresponding to the plurality of emails may be generated based upon the plurality of sets of content. Alternatively and/or additionally, a plurality of writing scores corresponding to the plurality of emails may be generated based upon the plurality of sets of content. Alternatively and/or additionally, a plurality of desirability scores may be generated based upon the plurality of sets of content. For example, the entity quality score may be generated based upon the plurality of informational scores, the plurality of writing scores and/or the plurality of desirability scores.

In some examples, the entity quality score may be generated based upon the plurality of quality scores. For example, an operation (e.g., a mathematical operation) may be performed using the plurality of quality scores to generate the entity quality score. For example, the entity quality score may correspond to a mean (e.g., an average quality score) of the plurality of quality scores. Alternatively and/or additionally, the entity quality score may correspond to a median of the plurality of quality scores. Alternatively and/or additionally, the entity quality score may correspond to a sum total of the plurality of quality scores. Alternatively and/or additionally, the entity quality score may be generated based upon the plurality of advertisement revenues.

At 412, a notification may be generated based upon the entity quality score. In some examples, the notification may be indicative of the entity quality score. For example, the notification may comprise a representation of the entity quality score. Alternatively and/or additionally, the notification may be indicative of the first quality score corresponding to the first email. For example, the notification may comprise a representation of the first quality score.

At 414, the notification may be transmitted to a client device associated with the first entity. For example, the notification may be an email which may be transmitted to the second email account associated with the first entity (and/or to a different email account associated with the first entity). Alternatively and/or additionally, the notification may be an instant message, a text message, and/or a different type of message.

In some examples, the entity quality score may be compared with a first threshold quality score. For example, responsive to a determination that the entity quality score is greater than the first threshold quality score, the first entity may be selected for inclusion into a reward pool. Alternatively and/or additionally, if the first entity is already included in the reward pool prior to transmitting the first email, the first entity may remain a part of the reward pool. For example, the reward pool may comprise a plurality of entities, wherein each entity of the plurality of entities is associated with a quality score exceeding the first threshold quality score. In some examples, each entity of the plurality of entities may receive compensation for transmitting emails to email accounts (associated with the communication service and/or the email service provider). For example, a compensation received by an entity of the plurality of entities may be calculated based upon a quality score associated with the entity.

For example, a quality compensation value corresponding to the first entity may be determined based upon the entity quality score. For example, an operation (e.g., a mathematical operation) may be performed using the entity quality score to determine the quality compensation value. In some examples, an electronic payment, generated based upon the quality compensation value, may be transmitted to an account (e.g., a bank account) associated with the first entity.

Alternatively and/or additionally, responsive to the determination that the entity quality score is greater than the first threshold quality score, a second notification may be generated. For example, the second notification may be indicative of the entity quality score exceeding the first threshold quality score. Alternatively and/or additionally, the second notification may be indicative of the first entity being selected for inclusion into the reward pool. Alternatively and/or additionally, the second notification may be indicative of the quality compensation value.

Alternatively and/or additionally, responsive to a determination that the entity quality score is less than the first threshold quality score, the first entity may not be selected for inclusion into the reward pool. Alternatively and/or additionally, if the first entity is included in the reward pool, the first entity may be removed from the reward pool. For example, responsive to removing the first entity from the reward pool, electronic payments may not be transmitted to the account associate with the first entity. In some examples, responsive to the determination that the entity quality score is less than the first threshold quality score, the first entity may be suspended (from the reward pool) for a first duration of time.

Alternatively and/or additionally, the first entity may be removed from the reward pool until the entity quality score exceeds the first threshold quality score. For example, after the first email is transmitted to the plurality of email accounts, the first entity may use an email account to transmit one or more emails to email accounts (associated with the communication service). For example, one or more quality scores and/or one or more sets of activity information associated with the one or more emails may be generated. For example, the one or more quality scores and/or the one or more sets of activity information may be stored in the entity profile. An updated version of the entity quality score may be generated based upon the entity profile comprising the one or more quality scores and/or the one or more sets of activity information. For example, the updated version of the entity quality score may exceed the first threshold quality score. In some examples, responsive to a determination that the updated version of the entity quality score exceeds the first threshold quality score, the first entity may be selected for inclusion into the reward pool.

In some examples, the entity quality score may be compared with a second threshold quality score. The second threshold quality score may be less than (and/or greater than) the first threshold quality score. In some examples, responsive to a determination that the entity quality score is less than the second threshold quality score, the first entity may be removed from the reward pool (e.g., the first entity may be permanently removed from the reward pool and/or temporarily suspended from the reward pool for a duration of time that is greater than the first duration of time).

Alternatively and/or additionally, the entity quality score may be compared with a third threshold quality score. In some examples, responsive to a determination that the entity quality score is less than the third threshold quality score, a third notification may be transmitted to a client device associated with the first entity. For example, the third notification may comprise instructions corresponding to designing future emails. For example, the instructions may comprise guidelines for composing high quality emails, such as including at least one or more images in an email, using correct spelling and/or grammar throughout text of the email, including informational content in the email, including various colors, other than black and/or white, in the email in order to increase user engagement, increasing an amount of content (e.g., text, images, and/or selectable inputs) of the email to increase time spent by users viewing the email, etc.

Alternatively and/or additionally, the entity quality score may be compared with a fourth threshold quality score. In some examples, responsive to a determination that the entity quality score is less than the fourth threshold quality score, emails transmitted and/or drafted by the second email account (and/or a different email account associated with the first entity) for target email accounts may undergo an automatic checking and/or optimizing process. For example, a request corresponding to transmitting and/or drafting a second email associated with the first entity for a second plurality of email accounts (associated with the communication service) may be received and/or the second email may be identified. For example, an automatic checking and/or optimizing process may be performed using the second email to determine whether a content quality of the second email meets a content quality threshold. For example, responsive to determining that the content quality of the second email is less than the content quality threshold (e.g., by identifying writing errors, by determining that an amount of content of the second email is less than a threshold amount of content, by determining that the second email is not visually appealing, etc.), the second email may be (automatically) modified.

For example, one or more fonts of one or more sets of text of the second email may be automatically modified (e.g., such that the second email is more visually appealing to users and/or to increase user engagement with the second email). Alternatively and/or additionally, one or more colors associated with a background of the second email, one or more colors associated with one or more sets of text of the second email, a format of the second email, etc. may be automatically modified (e.g., such that the second email is more visually appealing to users and/or to increase user engagement with the second email). Alternatively and/or additionally, text of the second email may be checked to identify writing errors, such as one or more spelling errors, one or more grammatical errors, etc. within the text of the second email. For example, the writing errors (e.g., the one or more spelling errors, the one or more grammatical errors, etc.) may be automatically corrected. In some examples, the second email may be modified into a modified version of the second email (e.g., based upon a determination that one or more characteristics of the modified version of the second email have historically been identified in one or more emails with desirable quality scores exceeding one or more threshold quality scores).

Alternatively and/or additionally, content of the second email may be analyzed to determine the amount of content associated with the second email. For example, the amount of content may correspond to an amount of text of the second email, a quantity of images of the second email, etc. For example, responsive to determining that the amount of content associated with the second email is less than the threshold amount of content, additional content, such as text, images, etc. may be added to the second email (automatically) to generate the modified version of the second email. For example, a set of links comprised within the second email may be identified. The set of links may be associated with a set of web pages (e.g., each link of the set of links may comprise a web address of a web page of the set of web pages). For example, the set of web pages may be accessed and/or scanned to identify relevant content (e.g., text, images, etc.) related to the second email. The relevant content may be extracted from the set of web pages and/or the additional content may be generated based upon the relevant content. The additional content may be added to the second email (automatically) in order to increase the amount of content associated with the second email. In some examples, the modified version of the second email, comprising the additional content, may be transmitted to the second plurality of email accounts.

Alternatively and/or additionally, the entity quality score may be compared with a fifth threshold quality score. For example, responsive to a determination that the entity quality score is greater than the fifth threshold quality score, email accounts may be selected for transmission of promotional emails associated with the first entity. In some examples, the email accounts may be selected for transmission of the promotional emails responsive to a determination that users associated with the email accounts have an interest in a topic associated with the first entity and/or the information service. For example, the first entity may be a news organization and/or the first information service may be associated with news. Alternatively and/or additionally, one or more email accounts of the email accounts may be selected for transmission of the promotional emails responsive to a determination that the one or more email accounts are subscribed to one or more information services associated with news. Alternatively and/or additionally, one or more email accounts of the email accounts may be selected for transmission of the promotional emails responsive to a determination that the one or more email accounts are associated with search activity and/or queries associated with news.

In some examples, the promotional emails may be generated. For example, emails of the promotional emails may be indicative of the information service associated with the first entity. Alternatively and/or additionally, emails of the promotional emails may be indicative of the entity quality score (e.g., an email of the promotional emails may comprise "Hello John, We've noticed you are subscribed to News One's newsletter. We recommend subscribing to the All News For You newsletter, because it has high quality content and many users prefer All News For You content over News One content."). Alternatively and/or additionally, emails of the promotional emails may comprise a selectable input corresponding to subscribing to the information service associated with the first entity. Alternatively and/or additionally, emails of the promotional emails may comprise a selectable input corresponding to receiving emails associated with the first entity.

In some examples, the first quality score (corresponding to the first email) may be compared with a sixth threshold quality score. For example, responsive to a determination that the first quality score is greater than the sixth threshold quality score, content of the first email may be posted on one or more platforms associated with the content system. For example, the content of the first email may be posted on one or more web pages associated with the content system.

Alternatively and/or additionally, the first quality score may be compared with the entity quality score. For example, responsive to a determination that the first quality score is less than the entity quality score, a fourth notification may be transmitted to a client device associated with the first entity. For example, the fourth notification may be indicative of a declining quality associated with the first entity. For example, the fourth notification may comprise "Dear folks at News One, we've noticed that the last email you sent is of lower quality than previous emails. This is a reminder that sending lower quality emails resulting in lower user engagement has an effect on our payments to you. If you would like to receive pointers on how to create high quality emails or if you would like to participate in our automatic checking/modification process so that emails sent to email accounts are automatically checked and/or modified, please visit our website".

Alternatively and/or additionally, the quality compensation value may be determined based upon the first quality score (rather than the entity quality score, for example). For example, an operation (e.g., a mathematical operation) may be performed using the first quality score to determine the quality compensation value. For example, the electronic payment, generated based upon the quality compensation value, may be transmitted to the account associated with the first entity.

In some examples, the email spam rate associated with the first email may be compared with a threshold spam rate (and/or the quantity of spam events may be compared with a threshold quantity of spam events). In some examples, responsive to a determination that the email spam rate exceeds the threshold spam rate, the first entity may be suspended from the reward pool for a second duration of time. Alternatively and/or additionally, responsive to the determination that the email spam rate exceeds the threshold spam rate, the first entity may be blacklisted such that emails associated with the first entity are (automatically) tagged as spam responsive to identifying the emails. Alternatively and/or additionally, responsive to determining that email spam rates corresponding to a third plurality of emails associated with the first entity are greater than the threshold spam rate and/or that a quantity of emails of the third plurality of emails is greater than a threshold quantity of spam emails, the first entity may be blacklisted such that emails associated with the first entity are (automatically) tagged as spam responsive to identifying the emails.

Alternatively and/or additionally, responsive to the determination that the email spam rate exceeds the threshold spam rate, a fifth notification may be transmitted to a client device associated with the first entity. For example, the fifth notification may be indicative of the email spam rate exceeding the threshold spam rate. Alternatively and/or additionally, the fifth notification may be indicative of the first entity being suspended from the reward pool. Alternatively and/or additionally, the fifth notification may comprise an indication of the threshold quantity of spam emails. Alternatively and/or additionally, the fifth notification may comprise instructions to for creating and/or transmitting emails that have low spam rates. For example, the fifth notification may comprise "Dear folks at News One, we've noticed that the last email you sent has a high spam rate and is considered spam. For this reason, you are suspended from the reward pool and you will not be receiving payments for two weeks. Just a reminder that if you send two more emails having high spam rates, you will be blacklisted and all your emails will be considered spam. In order to decrease spam rates of your future emails, do not send emails to unsolicited email accounts that did not subscribe to the News One newsletter. Further, check your emails for grammatical mistakes and spelling errors because many users are under the impression that emails with such mistakes are spam. Also, check to make sure that links you include in the email do not link to malicious web pages.".

It may be appreciated that one or more of the techniques presented herein may result in higher quality emails being transmitted to email accounts by automatically modifying emails transmitted to email accounts and/or by incentivizing entities to increase quality of emails and lower levels of spam emails in order to receive payment. Further, one or more of the techniques presented herein may result in better monetizing opportunities as a result of higher levels of user engagement with the higher quality emails, lower levels of spam emails that may be undesirable to users, higher rates of interactions and/or user engagement with email interfaces, etc.

It may be appreciated that one or more of the techniques presented herein may be implemented using a communication platform different than an email platform (e.g., messaging platforms, browsers, social media platforms, etc.). For example, using one or more of the techniques presented herein, quality scores may be generated based upon messages (e.g., instant messages, text messages, social media posts, etc.) transmitted to client devices and/or user accounts. Notifications and/or instructions associated with the quality scores may be transmitted to client devices associated with the entities, quality compensation values and/or payments may be determined based upon the quality scores, entities associated with the messages, may be selected for inclusion into the reward pool based upon the quality scores, etc.

FIGS. 5A-5D illustrate examples of a system 501 for evaluating email activity and/or controlling, based upon the email activity, transmission of instructions associated with quality. A first entity, such as a department store (e.g., "JJ's Department Store"), may be associated with an information service. For example, one or more email accounts associated with the first entity may transmit emails to email accounts subscribed to the information service (and/or email accounts that are not subscribed to the information service). For example, emails transmitted by the one or more email accounts may comprise product information associated with the first entity, promotional content associated with the first entity, service information associated with the first entity, event information associated with the first entity, etc.

Figure 5A:
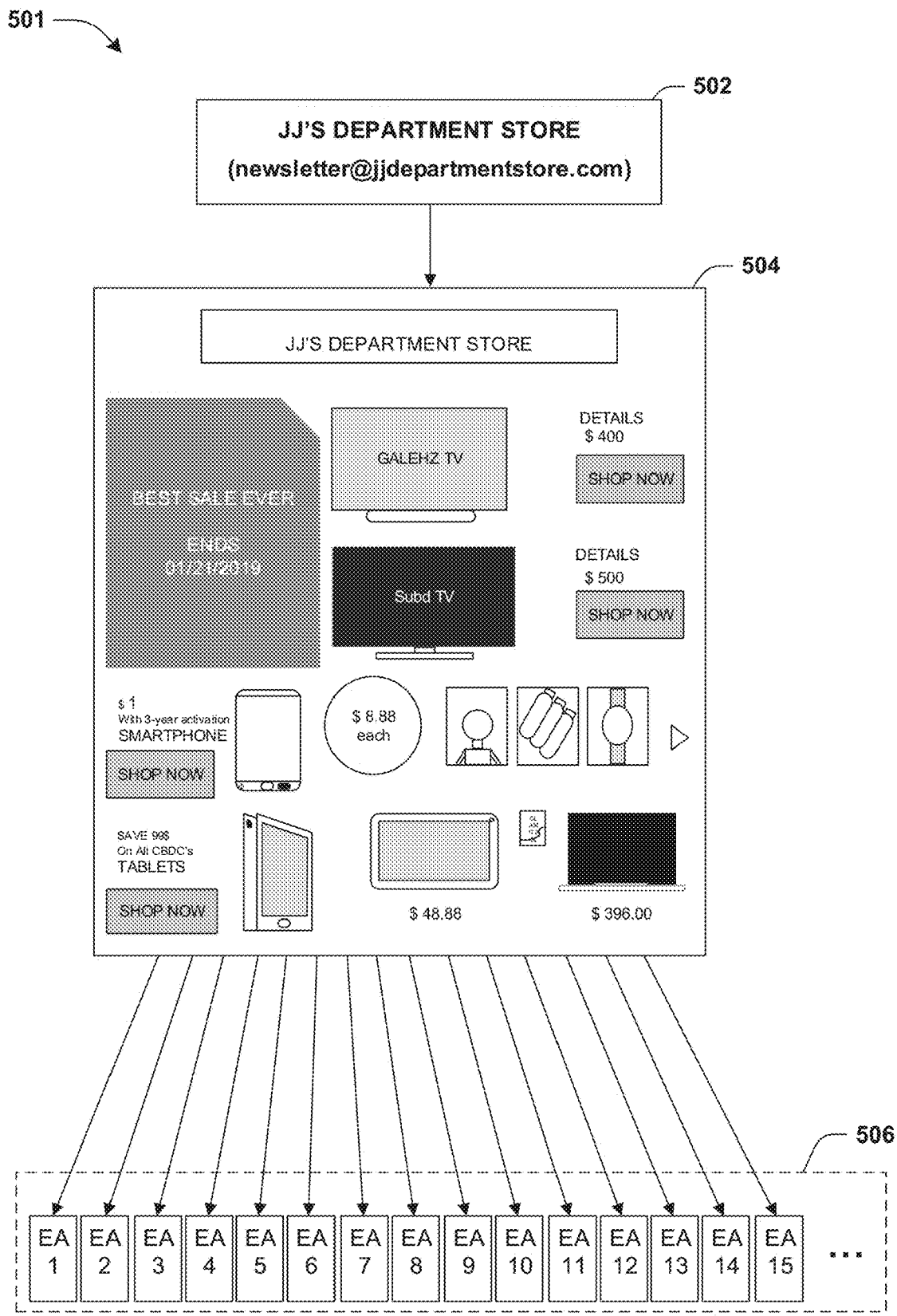
FIG. 5A is a component block diagram illustrating an example system for evaluating email activity and/or controlling, based upon the email activity, transmission of instructions associated with quality, where a first email is transmitted by a first email account to a plurality of email accounts.

FIG. 5A illustrates a first email 504 being transmitted by a first email account 502 to a plurality of email accounts 506. For example, the first email account may be associated with the first entity. For example, the first email account may be associated with a first email address (e.g., "newsletter@jjdepartmentstore.com"). In some examples, email accounts of the plurality of email accounts 506 may be subscribed to the information service. Alternatively and/or additionally, each email account of the plurality of email accounts 506 may be associated with an email service provider (e.g., a single email service provider). In some examples, the first email 504 may comprise product information associated with the first entity, promotional content associated with the first entity and/or event information associated with the first entity (e.g., a sales event where products are sold at a discount).

In some examples, the email service provider may be associated with a content system. For example, the content system may provide content items, such as advertisements, to be presented via one or more locations of one or more email interfaces associated with the email service provider. For example, one or more entities associated with the email service provider and/or the content system may receive compensation for presenting the content items (e.g., the advertisements) via the one or more email interfaces.

Figure 5B:
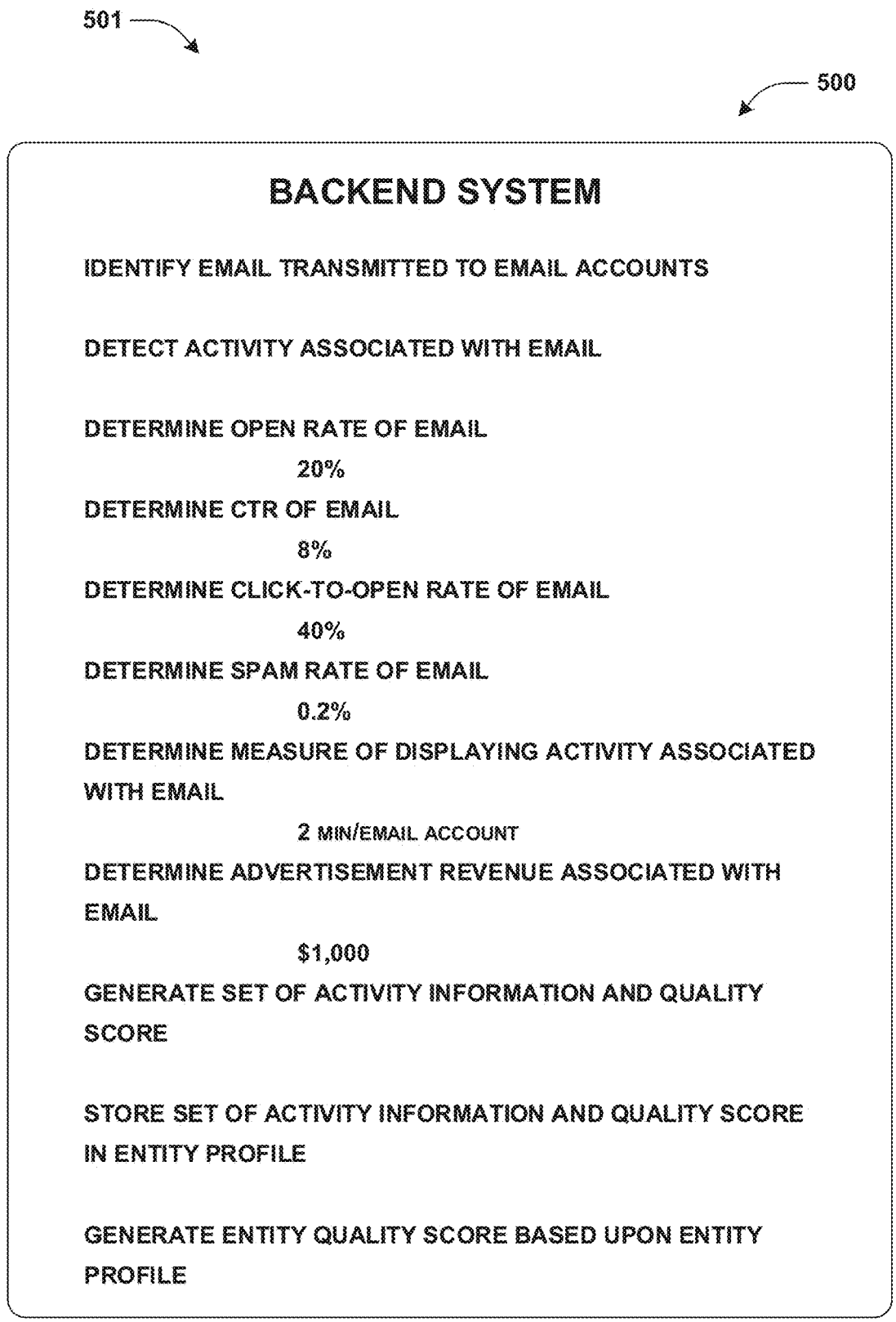
FIG. 5B is a component block diagram illustrating an example system for evaluating email activity and/or controlling, based upon the email activity, transmission of instructions associated with quality, where a backend system analyzes activity associated with a first email to generate one or more quality scores associated with a first entity.

FIG. 5B illustrates a backend system 500 of the content system and/or the email service provider analyzing activity associated with the first email 504 to generate one or more quality scores associated with the first entity. For example, the first email 504 may be identified. First activity performed using email accounts of the plurality of email accounts 506 may be detected. In some examples, a total quantity of email accounts of the plurality of email accounts 506 may be 10,000 (e.g., the plurality of email accounts 506 may comprise 10,000 email accounts).

In some examples, the first email 504 being opened using email interfaces associated with the plurality of email accounts 506 may be monitored and/or analyzed. For example, the first email 504 may be opened (e.g., displayed, accessed, selected, etc.) using an email interface corresponding to each email account of a first set of email accounts of the plurality of email accounts 506. For example, a first quantity of email accounts associated with opening the first email 504 may be determined. In some examples, the first quantity of email accounts may correspond to a quantity of email accounts of the first set of email accounts. For example, the first quantity of email accounts may be determined to be 2,000 email accounts.

In some examples, an email open rate associated with the first email 504 may be determined based upon the first quantity of email accounts and/or the total quantity of email accounts of the plurality of email accounts. In some examples, the email open rate may correspond to a proportion, a ratio and/or a percentage of email accounts, of the plurality of email accounts 506, that are associated with opening the first email 504. For example, the email open rate may be determined by dividing the first quantity of email accounts (e.g., 2,000 email accounts) by the total quantity of email accounts (e.g., 10,000 email accounts). For example, the email open rate associated with the first email 504 may be determined to be 20%.

In some examples, selections of selectable inputs of the first email 504 using email interfaces associated with the plurality of email accounts 506 may be monitored and/or analyzed. For example, the first email 504 may comprise a first set of selectable inputs. In some examples, a selection of one or more selectable inputs of the first set of selectable inputs using an email interface corresponding to each email account of a second set of email accounts of the plurality of email accounts 506 may be detected. For example, a second quantity of email accounts associated with selecting one or more selectable inputs of the first set of selectable inputs may be determined. In some examples, the second quantity of email accounts may correspond to a quantity of email accounts of the second set of email accounts. For example, the second quantity of email accounts may be determined to be 800 email accounts.

In some examples, an email CTR associated with the first email 504 may be determined based upon the second quantity of email accounts and/or the total quantity of email accounts of the plurality of email accounts. In some examples, the email CTR may correspond to a proportion, a ratio and/or a percentage of email accounts, of the plurality of email accounts 506, that are associated with selecting a selectable input of the first set of selectable inputs. For example, the email CTR may be determined by dividing the second quantity of email accounts (e.g., 800 email accounts) by the total quantity of email accounts (e.g., 10,000 email accounts). For example, the email CTR associated with the first email 504 may be determined to be 8%.

In some examples, an email click-to-open rate associated with the first email 504 may be determined based upon the second quantity of email accounts and/or the first quantity of email accounts (associated with opening the first email). In some examples, the email click-to-open rate may be determined by combining the second quantity of email accounts with the first quantity of email accounts. For example, the email click-to-open rate may be determined by dividing the second quantity of email accounts (e.g., 800 email accounts) by the first quantity of email accounts (e.g., 2,000 email accounts). For example, the email click-to-open rate associated with the first email 504 may be determined to be 40%.

In some examples, the first email 504 being marked as spam (e.g., marked as undesirable, marked as junk mail, etc.) using email interfaces associated with the plurality of email accounts 506 may be monitored and/or analyzed. For example, the first email 504 may be marked as spam using an email interface corresponding to each email account of a third set of email accounts of the plurality of email accounts 506. In some examples, a third quantity of email accounts associated with marking the first email 504 as spam may be determined. In some examples, the third quantity of email accounts may correspond to a quantity of email accounts of the third set of email accounts. For example, the third quantity of email accounts may be determined to be 20 email accounts.

In some examples, an email spam rate associated with the first email 504 may be determined based upon the third quantity of email accounts and/or the total quantity of email accounts of the plurality of email accounts 506. In some examples, the email spam rate may correspond to a proportion, a ratio and/or a percentage of email accounts, of the plurality of email accounts 506, that are associated with marking the first email 504 as spam. For example, the email spam rate may be determined by dividing the third quantity of email accounts (e.g., 20 email accounts) by the total quantity of email accounts (e.g., 10,000 email accounts). For example, the email spam rate associated with the first email 504 may be determined to be 0.2%.

In some examples, displaying activity associated with the first email 504 may be monitored and/or analyzed. For example, a plurality of time-lengths may be determined, wherein each time-length of the plurality of time-lengths may correspond to a duration of time that the first email 504 is displayed using a client device associated with an email account of the plurality of email accounts 506. In some examples, a measure of displaying activity may be generated based upon the plurality of time-lengths. For example, an operation (e.g., mathematical operation) may be performed using the plurality of time-lengths to generate the measure of displaying activity. For example, the measure of displaying activity may correspond to a mean (e.g., an average time-length) of the plurality of time-lengths. For example, the measure of displaying activity may be determined to be about 2 minutes per email account.

In some examples, a first set of activity information may be generated based upon the email open rate, the email CTR, the email click-to-open rate, the email spam rate and/or the measure of displaying activity. Alternatively and/or additionally, a first advertisement revenue received in association with a plurality of content items (provided by the content system) being displayed on client devices associated with email accounts of the plurality of email accounts 506, while activities associated with the first email 504 are performed, may be determined. Alternatively and/or additionally, the first advertisement revenue may be indicative of a payment amount and/or compensation received by one or more entities associated with the content system and/or the email service provider from entities associated with the plurality of content items for displaying the plurality of content items. For example, the first advertisement revenue may be determined to be $1,000.

In some examples, a first quality score corresponding to the first email 504 may be generated based upon the first set of activity information, content of the first email 504 and/or the first advertisement revenue. For example, the first quality score may be indicative of a quality of the first email 504. Alternatively and/or additionally, the first quality score may be indicative of a level of interest that users associated with the plurality of email accounts 506 may have in the first email 504, a level of engagement of users associated with the plurality of email accounts 506 with the first email 504, etc.

In some examples, the first set of activity information, the first advertisement revenue and/or the first quality score may be stored in an entity profile corresponding to the first entity. In some examples, the entity profile may comprise a plurality of sets of activity information, associated with a plurality of emails transmitted by one or more email accounts associated with the first entity. Alternatively and/or additionally, the plurality of sets of activity information may comprise the first set of activity information and/or the plurality of emails may comprise the first email 504. In some examples, each set of activity information of the plurality of sets of activity information may correspond to activity associated with an email of the plurality of emails.

Alternatively and/or additionally, the entity profile may comprise a plurality of advertisement revenues associated with the plurality of emails. For example, the plurality of advertisement revenues may comprise the first activity revenue. In some examples, each activity revenue of the plurality of activity revenues may correspond to an email of the plurality of emails. Alternatively and/or additionally, the entity profile may comprise a plurality of quality scores associated with the plurality of emails. For example, the plurality of quality scores may comprise the first quality score. In some examples, each quality score of the plurality of scores may be generated based upon content of an email of the plurality of emails, activity associated with the email and/or advertisement revenue associated with the email.

In some examples, an entity quality score corresponding to the first entity may be generated based upon the entity profile. For example, the entity quality score may be generated based upon the plurality of sets of activity information. Alternatively and/or additionally, the entity quality score may be generated based upon the plurality of quality scores. Alternatively and/or additionally, the entity quality score may be generated based upon the plurality of activity revenues.

In some examples, the entity quality score may be compared with a first threshold quality score. For example, responsive to a determination that the entity quality score exceeds the first threshold quality score, the first entity may be selected for inclusion into a reward pool. For example, the reward pool may comprise a plurality of entities, wherein each entity of the plurality of entities is associated with a quality score exceeding the first threshold quality score. In some examples, each entity of the plurality of entities may receive compensation for transmitting emails to email accounts (associated with the email service provider).

For example, a quality compensation value corresponding to the first entity may be determined based upon the entity quality score and/or the first quality score. For example, an operation (e.g., a mathematical operation) may be performed using the entity quality score and/or the first quality score to determine the quality compensation value. In some examples, an electronic payment, generated based upon the quality compensation value, may be transmitted to an account (e.g., a bank account) associated with the first entity.

In some examples, responsive to the determination that the entity quality score exceeds the first threshold quality score, a notification may be generated. For example, the notification may be indicative of the entity quality score exceeding the first threshold quality score. Alternatively and/or additionally, the notification may be indicative of the first entity being selected for inclusion into the reward pool. Alternatively and/or additionally, the notification may be indicative of the quality compensation value. Alternatively and/or additionally, the notification may comprise instructions associated with transmission of the electronic payment to the account associated with the first entity. In some examples, a second email 518 (illustrated in FIG. 5C), comprising the notification, may be transmitted to a second email account associated with the first entity (and/or to the first email account 502 associated with the first entity).

Figure 5C:
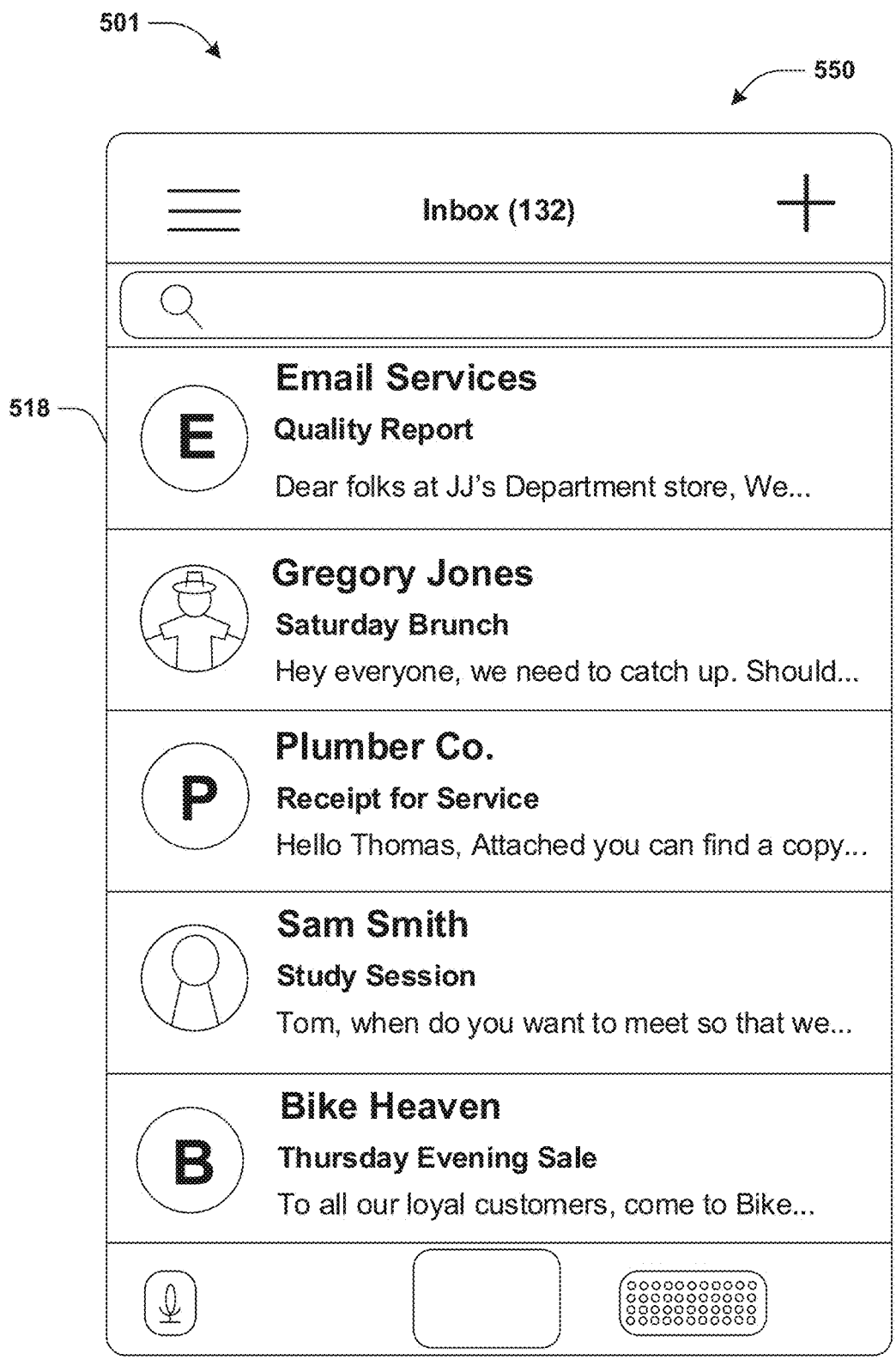
FIG. 5C is a component block diagram illustrating an example system for evaluating email activity and/or controlling, based upon the email activity, transmission of instructions associated with quality, where a graphical user interface of a first client device is controlled to display an email interface.
Figure 5D:
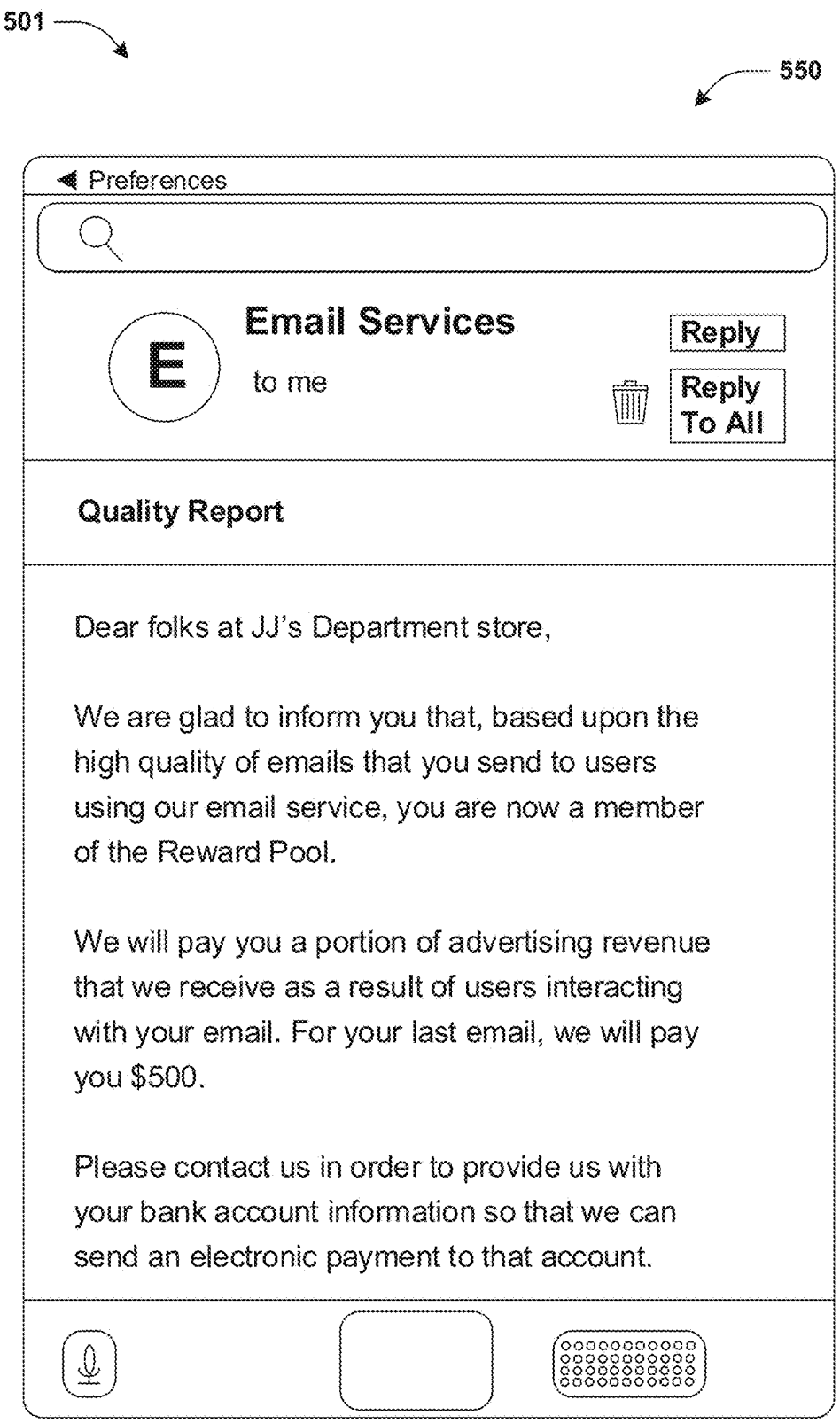
FIG. 5D is a component block diagram illustrating an example system for evaluating email activity and/or controlling, based upon the email activity, transmission of instructions associated with quality, where a graphical user interface of a first client device is controlled to display a second email.

FIG. 5C illustrates a graphical user interface of a first client device 550 associated with the first entity being controlled to display an email interface. For example, the email interface may comprise a list of emails comprising the second email 518. For example, responsive to a selection of the second email 518, the second email 518 may be opened. FIG. 5D illustrates the graphical user interface of the first client device 550 being controlled to display the second email 518. For example, the second email 518 may be displayed responsive to the selection of the second email 518 from the list of emails.

It may be appreciated that the disclosed subject matter may assist a first user associated with an entity (e.g., and/or a first client device associated with the first user) in transmitting high quality content, receiving compensation for transmitting high quality content to client devices and/or being provided with instructions and/or guidelines for increasing quality of content, thus incentivizing and enabling the first user to increase content quality of content that is transmitted by the first client device. Alternatively and/or additionally, the disclosed subject matter may assist a second user (e.g., and/or a second client device associated with the second user) in receiving high quality content (e.g., via emails and/or messages) associated with the entity.

Implementation of at least some of the disclosed subject matter may lead to benefits including, but not limited to, a reduction in screen space and/or an improved usability of a display (e.g., of the second client device) (e.g., as a result of incentivizing the first user and/or the entity to increase amounts of content of emails transmitted to email accounts, as a result of automatically increasing amounts of content of emails transmitted to email accounts by adding relevant content to the emails, as a result of the second user being provided with an increased amount of content such that the second user does not need to navigate to separate web pages to find relevant content and/or such that the second user does not need to open a search engine in order to search for the relevant content, etc.).

Alternatively and/or additionally, implementation of at least some of the disclosed subject matter may lead to benefits including an improved email interface (e.g., as a result of receiving a request from the first client device to transmit an email to a plurality of email accounts, as a result of automatically modifying the email to a modified version of the email by modifying one or more fonts and/or one or more colors associated with the email such that the email is more visually appealing to users, by checking for writing errors and/or correcting any identified writing errors, by automatically adding relevant content to the email, such that the first user does not need to browse through various web pages to find relevant content to add to the first email and/or such that the first user does not need to open a search engine in order to search for the relevant content to add to the email, etc.).

Alternatively and/or additionally, implementation of at least some of the disclosed subject matter may lead to benefits including an improvement to a display interface and/or a reduction in bandwidth (e.g., as a result of reducing a need for the first user to open a separate application and/or a separate window in order to search throughout the internet and/or navigate through internet content to find the relevant content to add to the email, as a result of the second user being provided with an increased amount of content in the email such that the second user does not need to open a separate application and/or a separate window in order to search throughout the internet and/or navigate through internet content to find the relevant content to consume, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
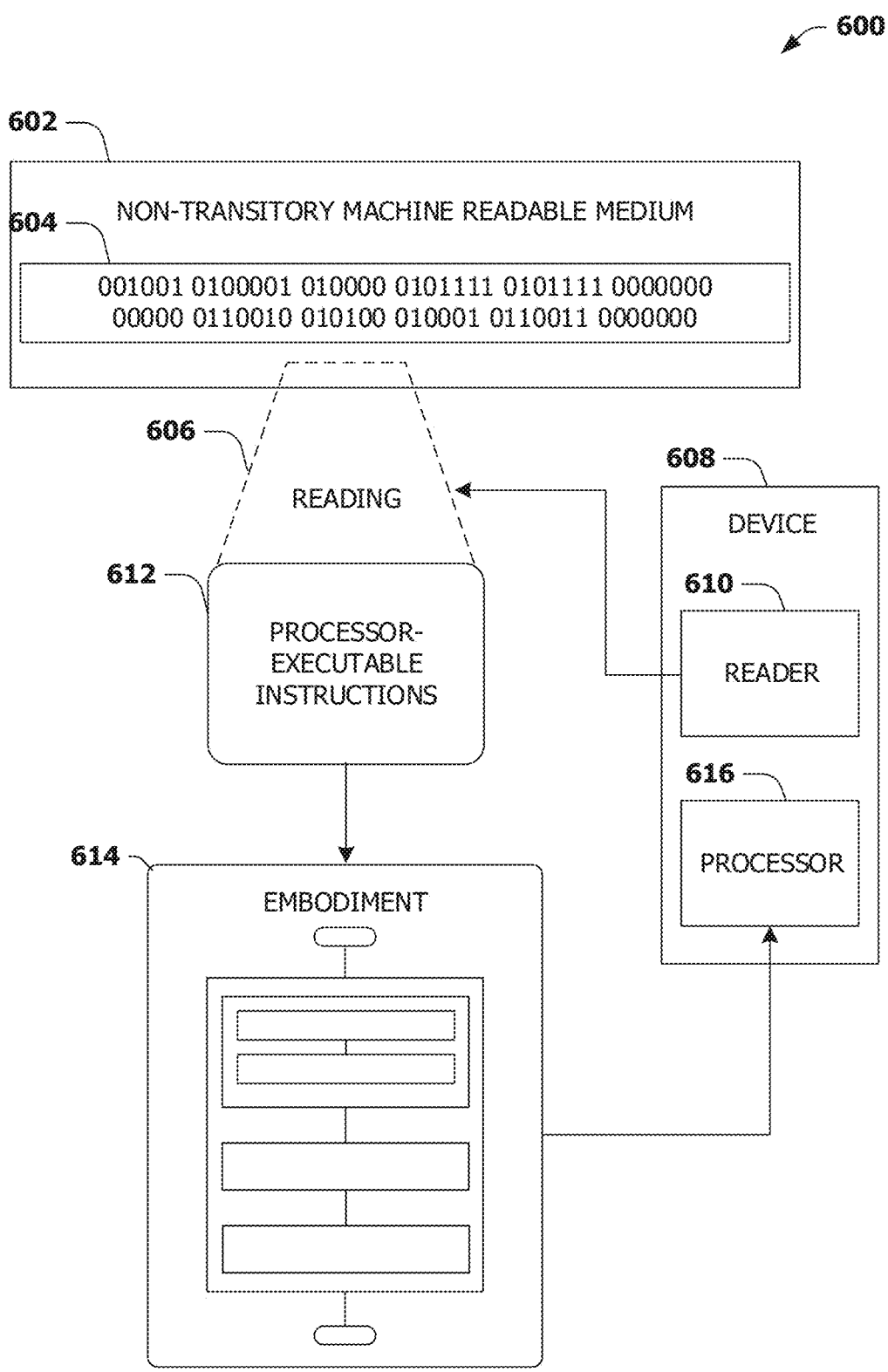
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

identifying a first email transmitted, by a first email account associated with a first entity, to a plurality of email accounts;

detecting first activity, performed using email accounts of the plurality of email accounts, associated with the first email, wherein the first activity comprises at least two of the first email being forwarded, the first email being deleted, the first email being marked as spam, the first email being marked as desirable, a first social media post, comprising content related to the first email, being posted, or a first query, associated with content of the first email, being used to perform a first search;

analyzing the first activity to generate a first set of activity information corresponding to the first activity;

storing the first set of activity information in an entity profile associated with the first entity, wherein:

the entity profile comprises a plurality of sets of activity information associated with a plurality of emails transmitted by one or more email accounts associated with the first entity;

the plurality of sets of activity information comprises the first set of activity information and a second set of activity information corresponding to second activity performed using second email accounts to which a second email was transmitted, wherein the second activity comprises at least two of the second email being forwarded, the second email being deleted, the second email being marked as spam, the second email being marked as desirable, a second social media post, comprising content related to the second email, being posted or a second query, associated with content of the second email, being used to perform a second search;
the plurality of emails comprises the first email and the second email; and
each set of activity information of the plurality of sets of activity information corresponds to activity associated with an email of the plurality of emails;
generating an entity quality score, for the first entity and representative of a quality of multiple emails transmitted to two or more recipients in association with the first entity, based upon the entity profile associated with the first entity and indicative of the plurality of sets of activity information comprising (i) the first set of activity information corresponding to the first activity performed using the email accounts to which the first email was transmitted and (ii) the second set of activity information corresponding to the second activity performed using the second email accounts to which the second email was transmitted, wherein at least two of a forwarding of an email impacts the entity quality score positively, a deletion of an email impacts the entity quality score negatively, a marking as spam of an email impacts the entity quality score negatively, a marking as desirable of an email impacts the entity quality score positively, the first social media post being posted impacts the entity quality score positively or the query being used to perform the search impacts the entity quality score positively;
comparing (i) the entity quality score representative of the quality of the multiple emails transmitted to two or more recipients in association with the first entity to (ii) a threshold quality score; and
responsive to determining that the entity quality score representative of the quality of the multiple emails transmitted to two or more recipients in association with the first entity is less than the threshold quality score:
generating, by a server, an instructional email comprising instructions for creating quality emails based upon the entity quality score representative of the quality of the multiple emails transmitted to two or more recipients in association with the first entity; and
transmitting, from the server, the instructional email comprising instructions for creating quality emails to a first client device associated with the first entity.

2. The method of claim 1, comprising:
analyzing content of the plurality of emails, wherein the generating the entity quality score is performed based upon the content of the plurality of emails.

3. The method of claim 1, wherein:
the analyzing the first activity comprises determining a click through rate (CTR) associated with the first email;
the first set of activity information is indicative of the CTR; and
the generating the entity quality score is performed based upon a plurality of CTRs, comprising the CTR, associated with the plurality of sets of activity information.

4. The method of claim 1, wherein:
the analyzing the first activity comprises determining a click-to-open rate associated with the first email;
the first set of activity information is indicative of the click-to-open rate; and
the generating the entity quality score is performed based upon a plurality of click-to-open rates, comprising the click-to-open rate, associated with the plurality of sets of activity information.

5. The method of claim 1, wherein:
the analyzing the first activity comprises determining an open rate associated with the first email;
the first set of activity information is indicative of the open rate; and
the generating the entity quality score is performed based upon a plurality of open rates, comprising the open rate, associated with the plurality of sets of activity information.

6. The method of claim 1, comprising:
receiving, from one or more email accounts of the plurality of email accounts, one or more messages indicative of the first email being marked spam; and
determining a spam rate associated with the first email based upon the one or more messages, wherein:
the first set of activity information is indicative of the spam rate; and
the generating the entity quality score is performed based upon a plurality of spam rates, comprising the spam rate, associated with the plurality of sets of activity information.

7. The method of claim 1, wherein the analyzing the first activity comprises determining time-lengths that the first email is displayed using client devices associated with email accounts of the plurality of email accounts, the method comprising:
generating a measure of displaying activity based upon the time-lengths, wherein:
the first set of activity information is indicative of the measure of displaying activity; and
the generating the entity quality score is performed based upon a plurality of measures of displaying activity, comprising the measure of displaying activity, associated with the plurality of sets of activity information.

8. The method of claim 1, comprising:
determining a first advertisement revenue received in association with advertisements being displayed on client devices, associated with email accounts of the plurality of email accounts, in association with the first email; and
storing the first advertisement revenue in the entity profile, wherein:
the entity profile comprises a plurality of advertisement revenues associated with the plurality of emails;
the plurality of advertisement revenues comprises the first advertisement revenue;
each advertisement revenue of the plurality of advertisement revenues is received in association with an email of the plurality of emails; and
the generating the entity quality score is performed based upon the plurality of advertisement revenues.

9. The method of claim 1, comprising:
updating the entity profile associated with the first entity based upon further activity information;
generating an updated entity quality score, for the first entity and representative of an updated quality of multiple emails transmitted to two or more recipients in association with the first entity, based upon the updated entity profile associated with the first entity;
comparing (i) the updated entity quality score representative of the updated quality of the multiple emails transmitted to two or more recipients in association with the first entity to (ii) the threshold quality score; and responsive to determining that the updated entity quality score representative of the updated quality of the multiple emails transmitted to two or more recipients in association with the first entity is greater than the threshold quality score:
  determining, by the server, an email quality compensation value based upon the updated entity quality score representative of the updated quality of the multiple emails transmitted to two or more recipients in association with the first entity; and
  transmitting, by the server, an electronic payment based upon the email quality compensation value to an account associated with the first entity.

10. The method of claim 1, comprising:
responsive to determining that the entity quality score is less than the threshold quality score, transmitting a second notification to the first client device indicative of the entity quality score being less than the threshold quality score.

11. The method of claim 1, comprising:
responsive to determining that the entity quality score is less than the threshold quality score, suspending the first entity from one or more services for a duration of time.

12. The method of claim 1, comprising:
updating the entity profile associated with the first entity based upon further activity information;
generating an updated entity quality score, for the first entity and representative of an updated quality of multiple emails transmitted to two or more recipients in association with the first entity, based upon the updated entity profile associated with the first entity;
comparing (i) the updated entity quality score representative of the updated quality of the multiple emails transmitted to two or more recipients in association with the first entity to (ii) the threshold quality score; and
responsive to determining that the updated entity quality score representative of the updated quality of the multiple emails transmitted to two or more recipients in association with the first entity is greater than the threshold quality score:
  generating, by the server, one or more emails, wherein each email of the one or more emails comprises a selectable input corresponding to subscribing to an information service associated with the first entity to receive emails associated with the first entity; and
  transmitting, from the server, the one or more emails to one or more email accounts.

13. The method of claim 12, comprising:
determining a topic associated with the first entity, wherein the one or more email accounts are selected for transmission of the one or more emails responsive to a determination that each email account of the one or more email accounts received an email associated with the topic.

14. The method of claim 1, wherein:
the first activity comprises the first social media post, comprising content related to the first email, being posted; and
the first social media post being posted impacts the entity quality score positively.

15. The method of claim 1, wherein:
the first activity comprises the first query, associated with content of the first email, being used to perform the first search; and
the query being used to perform the search impacts the entity quality score positively.

16. A computing device comprising:
a processor; and
memory comprising processor-executable instructions that when executed by the processor cause performance of operations, the operations comprising:
  identifying a first email transmitted, by a first email account associated with a first entity, to a plurality of email accounts;
  detecting first activity, performed using email accounts of the plurality of email accounts, associated with the first email, wherein the first activity comprises at least two of the first email being forwarded, the first email being deleted, the first email being marked as spam, the first email being marked as desirable, a first social media post, comprising content related to the first email, being posted, or a first query, associated with content of the first email, being used to perform a first search;
  analyzing the first activity to generate a first set of activity information corresponding to the first activity;
  storing the first set of activity information in an entity profile associated with the first entity, wherein:
    the entity profile comprises a plurality of sets of activity information associated with a plurality of emails transmitted by one or more email accounts associated with the first entity;
    the plurality of sets of activity information comprises the first set of activity information;
    the plurality of emails comprises the first email; and
    each set of activity information of the plurality of sets of activity information corresponds to activity associated with an email of the plurality of emails;
  generating a quality score, for the first entity and corresponding to multiple emails transmitted to two or more recipients in association with the first entity, based upon the entity profile associated with the first entity and indicative of the plurality of sets of activity information comprising the first set of activity information corresponding to the first activity performed using the email accounts to which the first email was transmitted, wherein at least two of a forwarding of an email impacts the entity quality score positively, a deletion of an email impacts the entity quality score negatively, a marking as spam of an email impacts the entity quality score negatively, a marking as desirable of an email impacts the entity quality score positively, the first social media post being posted impacts the entity quality score positively or the query being used to perform the search impacts the entity quality score positively;
  comparing (i) the quality score corresponding to the multiple emails transmitted to two or more recipients in association with the first entity to (ii) a threshold quality score; and
  responsive to determining that the quality score corresponding to the multiple emails transmitted to two or more recipients in association with the first entity is less than the threshold quality score, at least one of:
    generating and transmitting, by a server, instructions for creating quality emails to a first client device associated with the first entity; or automatically modifying, by the server, one or more emails transmitted by the first email account prior to transmission of the one or more emails to one or more recipients, wherein the one or more emails being automatically modified comprise different content than the plurality of emails used to generate the quality score.

17. The computing device of claim 16, the operations comprising:
generating and transmitting the instructions for creating quality emails to the first client device associated with the first entity.

18. The computing device of claim 16, the operations comprising:
automatically modifying the one or more emails transmitted by the first email account prior to transmission of the one or more emails to one or more recipients.

19. A non-transitory machine readable medium having stored thereon processor-executable instructions that when executed cause performance of operations, the operations comprising:
identifying a first message transmitted, by a first client device associated with a first entity, to a plurality of client devices associated with a plurality of user accounts, wherein each client device of the plurality of client devices is associated with a user account of the plurality of user accounts;
detecting first activity, performed using client devices of the plurality of client devices, associated with the first message, wherein the first activity comprises at least two of the first message being forwarded, the first message being deleted, the first message being marked as spam, the first message being marked as desirable, a first social media post, comprising content related to the first message, being posted, or a first query, associated with content of the first message, being used to perform a first search;
analyzing the first activity to generate a first quality score corresponding to the first message;
storing the first quality score in an entity profile associated with the first entity, wherein:
the entity profile comprises a plurality of quality scores associated with a plurality of messages transmitted by one or more client devices associated with the first entity;
the plurality of quality scores comprises the first quality score;
the plurality of messages comprises the first message; and
each quality score of the plurality of quality scores corresponds to a message of the plurality of messages;
generating an entity quality score, for the first entity and corresponding to multiple messages transmitted to two or more recipients in association with the first entity, based upon the entity profile associated with the first entity and indicative of the plurality of quality scores comprising the first quality score corresponding to the first activity performed using the client devices to which the first message was transmitted, wherein at least two of a forwarding of an message impacts the entity quality score positively, a deletion of an message impacts the entity quality score negatively, a marking as spam of an message impacts the entity quality score negatively, a marking as desirable of an message impacts the entity quality score positively, the first social media post being posted impacts the entity quality score positively or the query being used to perform the search impacts the entity quality score positively;
comparing (i) the entity quality score corresponding to the multiple messages transmitted to two or more recipients in association with the first entity to (ii) a threshold quality score; and
based upon the entity quality score corresponding to the multiple messages transmitted to two or more recipients in association with the first entity being less than the threshold quality score, at least one of:
generating and transmitting, by a server, instructions for creating quality messages to at least one of an account associated with the first entity or the first client device associated with the first entity; or
automatically modifying, by the server, one or more messages transmitted by a first user account prior to transmission of the one or more messages to one or more recipients, wherein the one or more messages being automatically modified comprise different content than the plurality of messages used to generate the quality score.

20. The non-transitory machine readable medium of claim 19, the operations comprising:
generating and transmitting the instructions for creating quality messages to at least one of the account associated with the first entity or the first client device associated with the first entity.

21. A method, comprising:
identifying a first email transmitted, by a first email account associated with a first entity, to a plurality of email accounts;
detecting first activity, performed using email accounts of the plurality of email accounts, associated with the first email, wherein the first activity comprises at least two of the first email being forwarded, the first email being deleted, the first email being marked as spam, the first email being marked as desirable, a first social media post,
comprising content related to the first email, being posted, or a first query, associated with content of the first email, being used to perform a first search;
analyzing the first activity to generate a first set of activity information corresponding to the first activity;
storing the first set of activity information in an entity profile associated with the first entity, wherein:
the entity profile comprises a plurality of sets of activity information associated with a plurality of emails transmitted by one or more email accounts associated with the first entity;
the plurality of sets of activity information comprises the first set of activity information;
the plurality of emails comprises the first email; and
each set of activity information of the plurality of sets of activity information corresponds to activity associated with an email of the plurality of emails;
generating a quality score, corresponding to the first entity, based upon the entity profile associated with the first entity and indicative of the plurality of sets of activity information comprising the first set of activity information corresponding to the first activity performed using the email accounts to which the first email was transmitted;
comparing (i) the quality score generated based upon the entity profile associated with the first entity to (ii) a threshold quality score; and responsive to determining that the quality score is less than the threshold quality score, automatically modifying one or more emails transmitted by the first email account prior to transmission of the one or more emails to one or more recipients, wherein the one or more emails being automatically modified comprise different content than the plurality of emails used to generate the quality score.

\* \* \* \* \*